July 22, 1941.　　　　H. GOLDBERG　　　　2,249,758
NUT TAPPING MACHINE
Filed Feb. 19, 1938　　　12 Sheets-Sheet 1

Inventor,
Herman Goldberg
by Davis, Lindsey, Smith & Shonts,
Attys

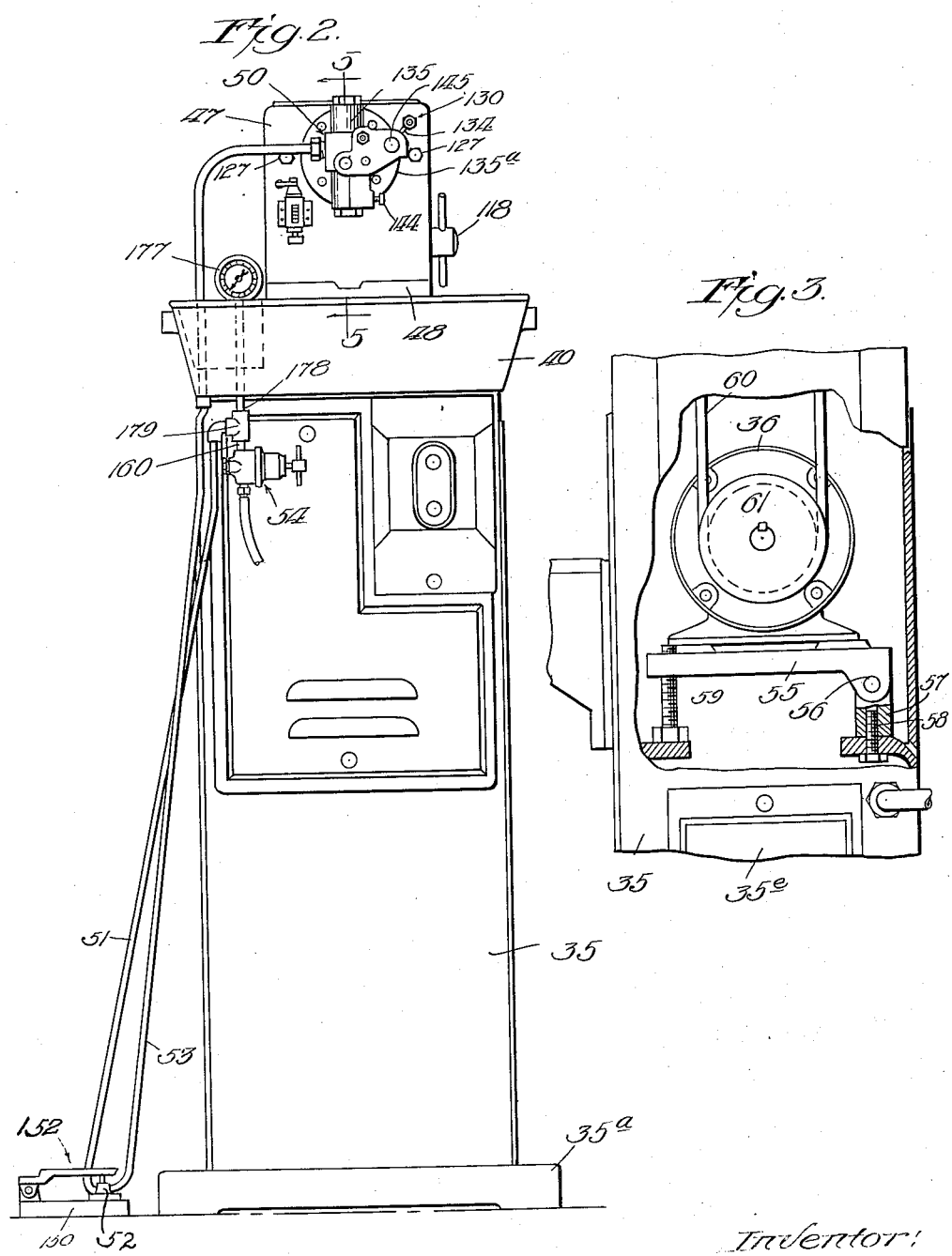

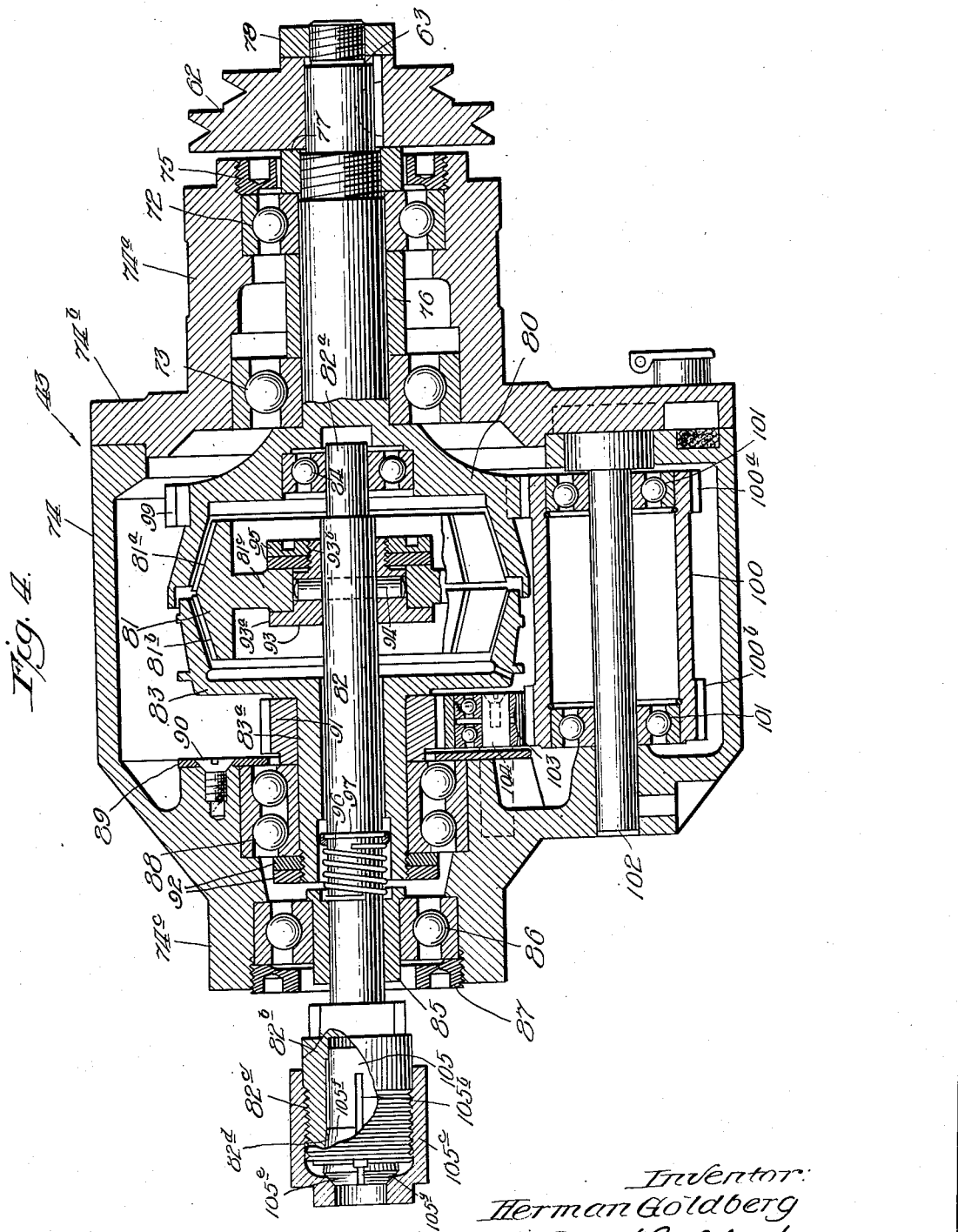

July 22, 1941.  H. GOLDBERG  2,249,758
NUT TAPPING MACHINE
Filed Feb. 19, 1938  12 Sheets-Sheet 4
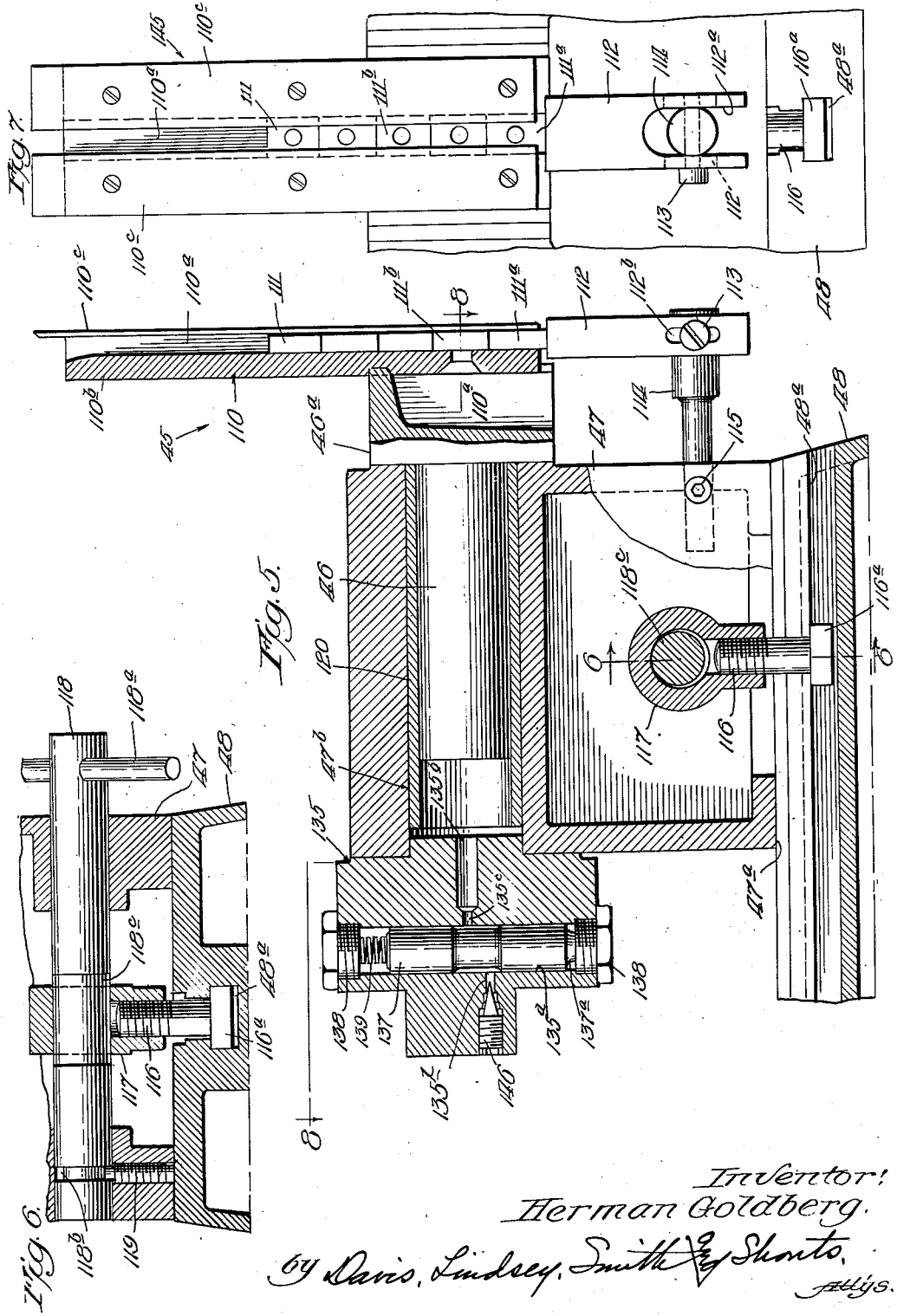
Inventor:
Herman Goldberg.
By Davis, Lindsey, Smith & Shonts,
Attys.

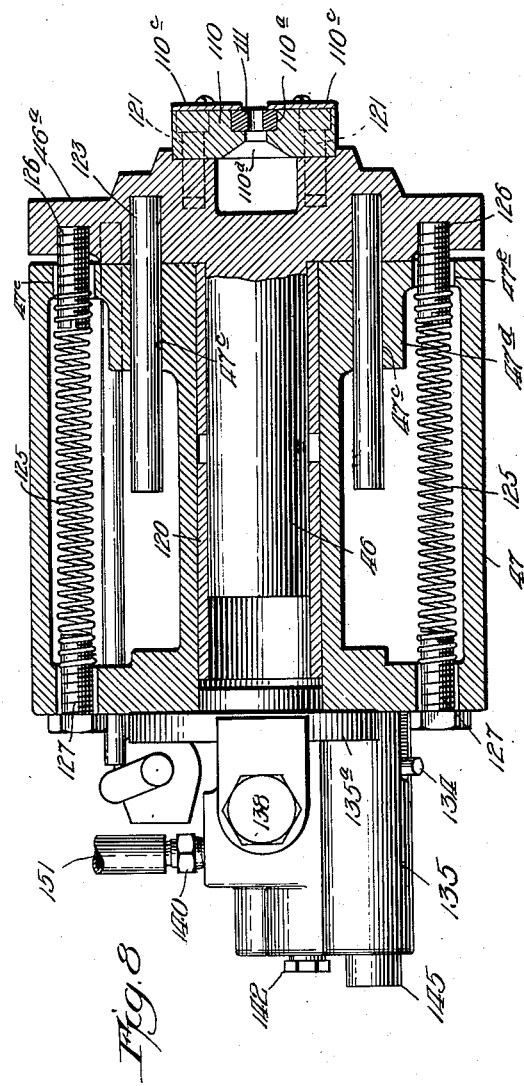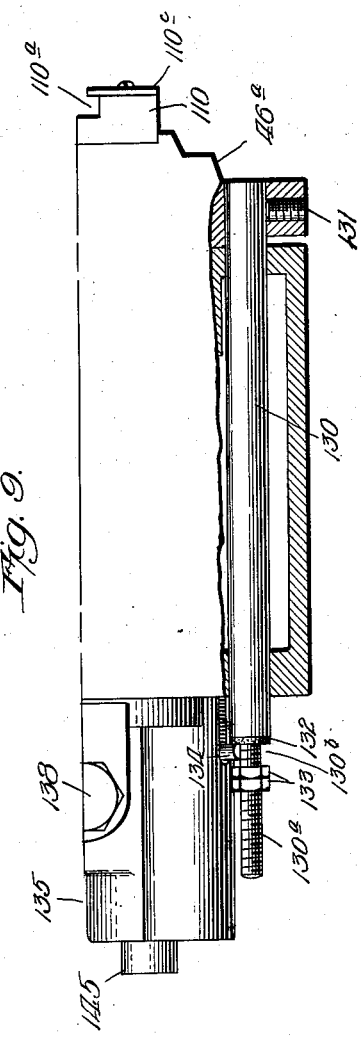

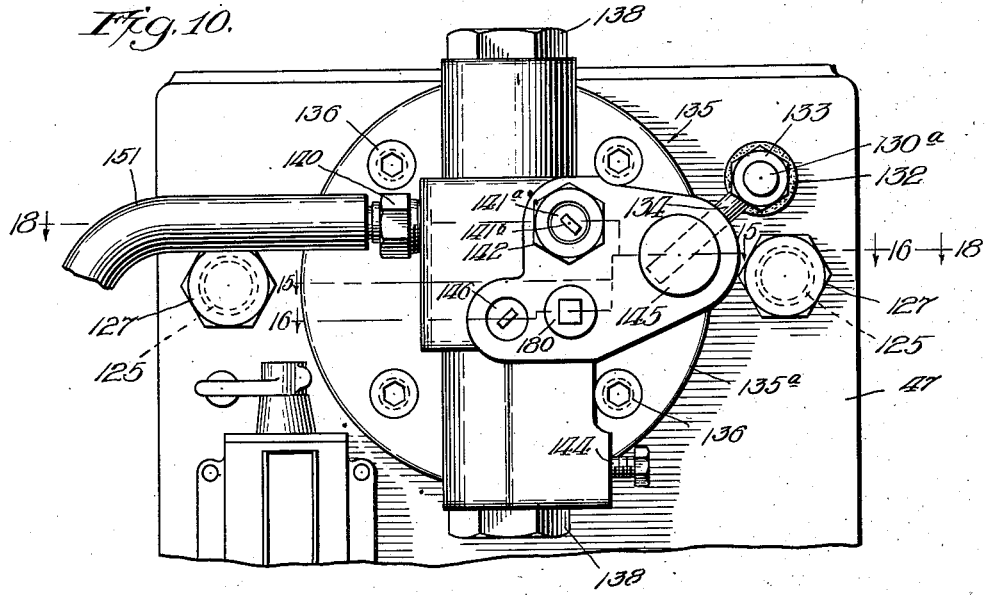
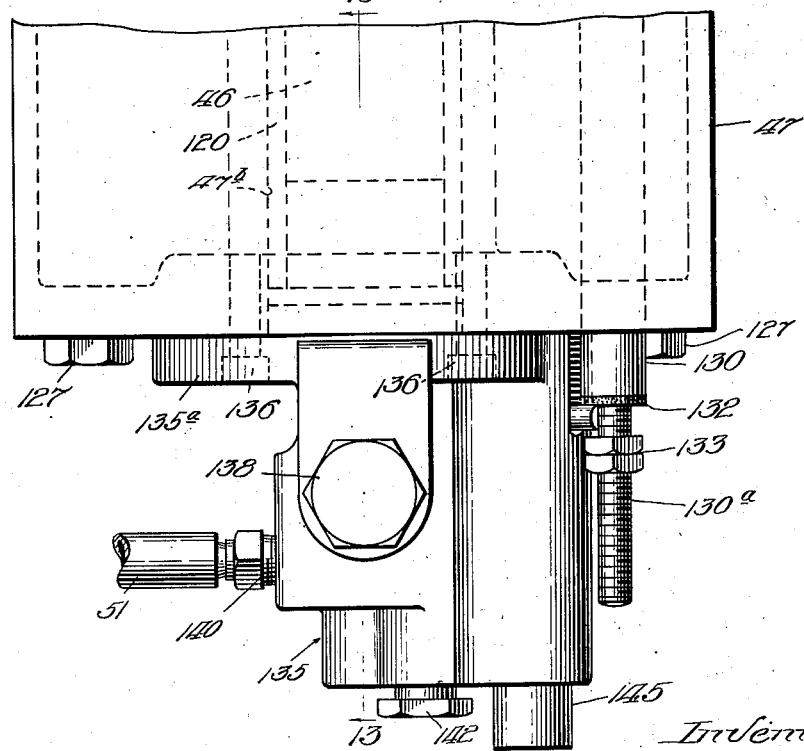

July 22, 1941.     H. GOLDBERG     2,249,758
NUT TAPPING MACHINE
Filed Feb. 19, 1938     12 Sheets-Sheet 7
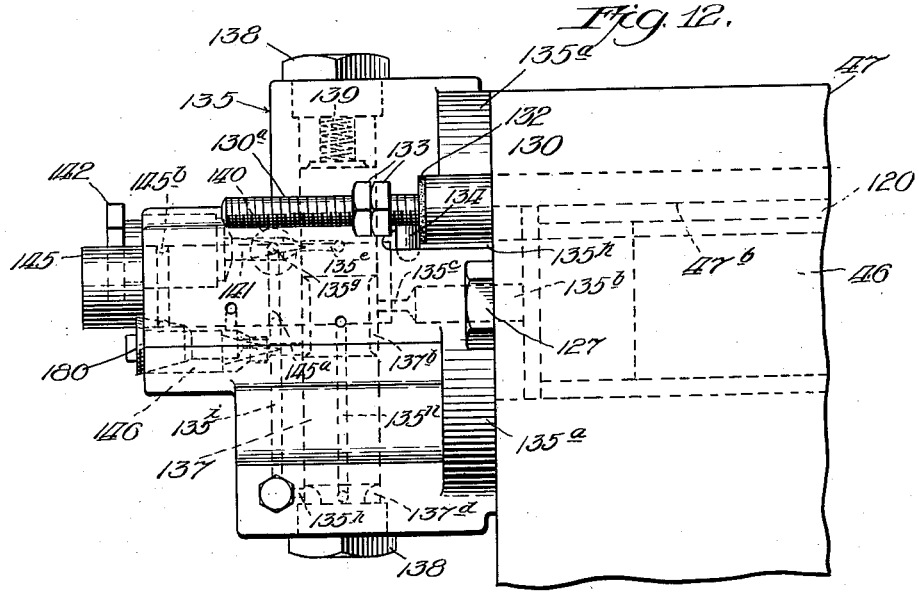
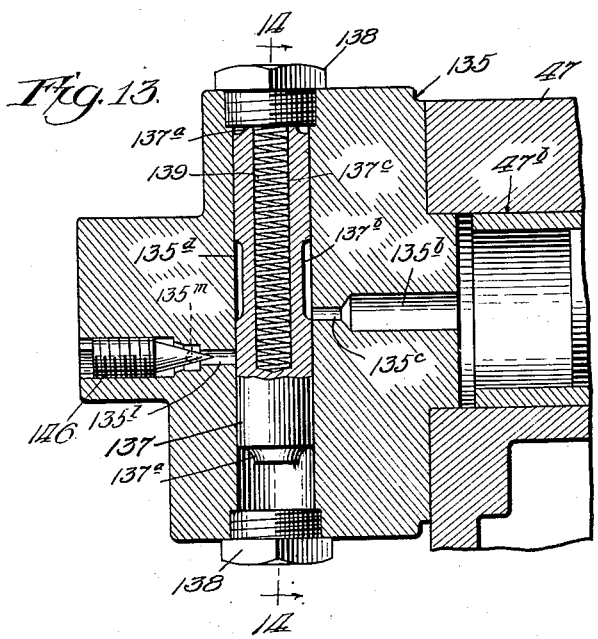 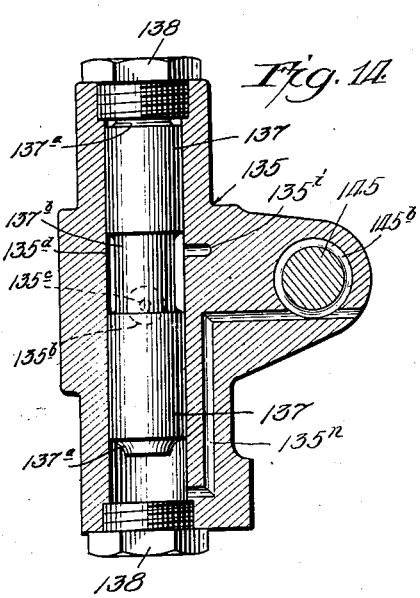
Inventor:
Herman Goldberg
by Davis, Lindsey, Smith & Shonts,
Attys.

July 22, 1941.  H. GOLDBERG  2,249,758
NUT TAPPING MACHINE
Filed Feb. 19, 1938  12 Sheets-Sheet 8
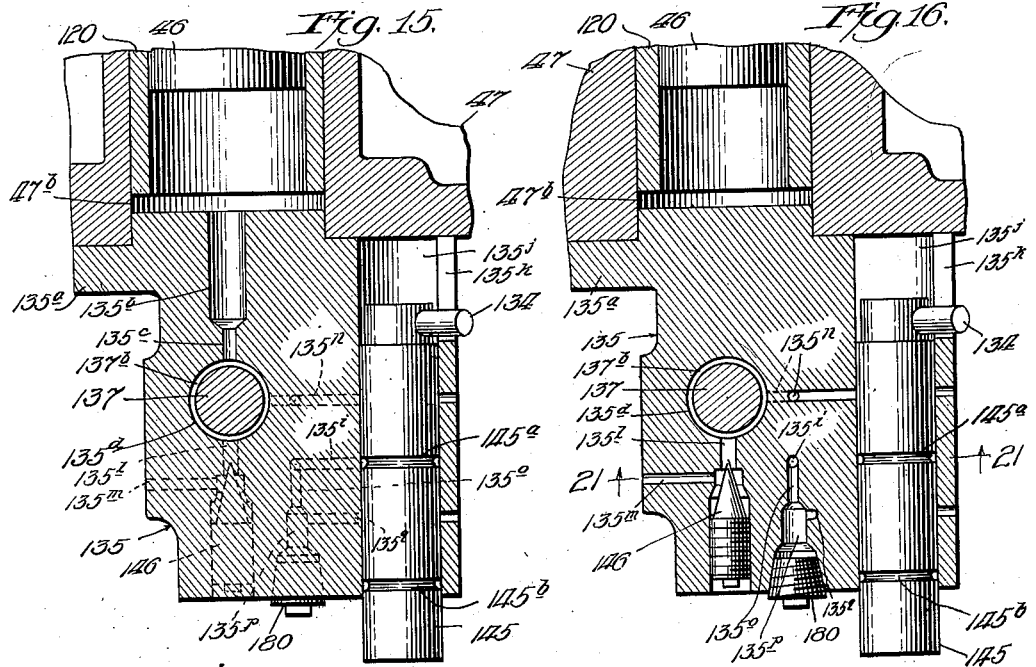
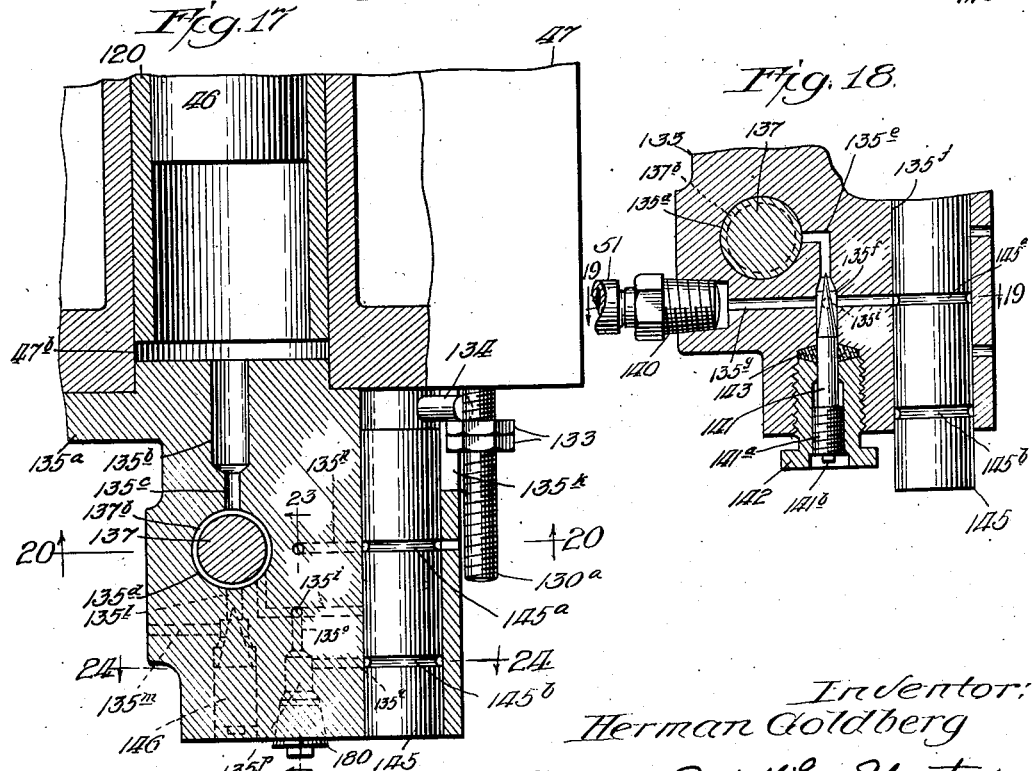
Inventor:
Herman Goldberg
by Davis, Lindsey, Smith & Shonts,
Attys.

July 22, 1941.  H. GOLDBERG  2,249,758
NUT TAPPING MACHINE
Filed Feb. 19, 1938  12 Sheets-Sheet 9
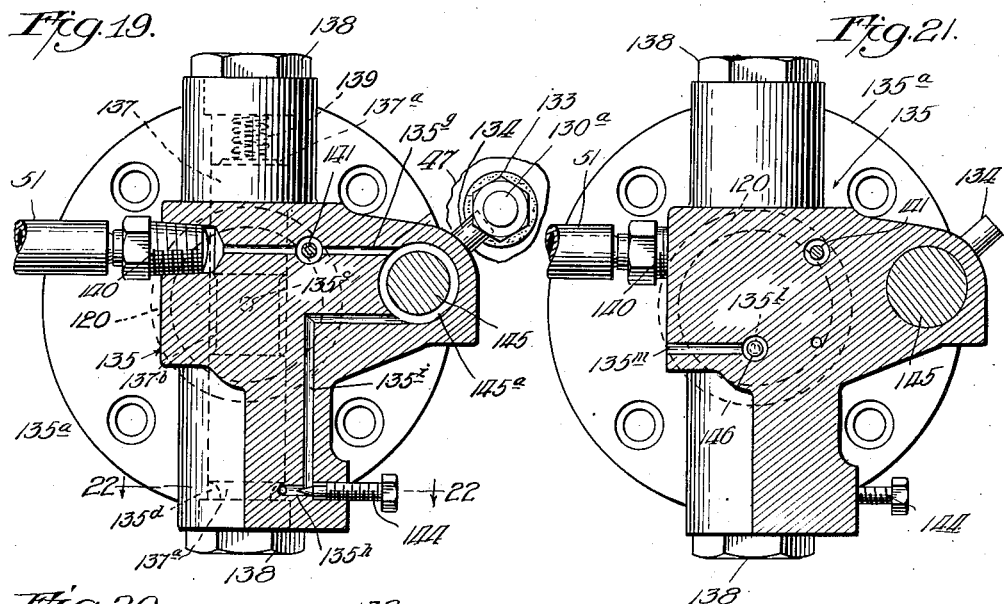
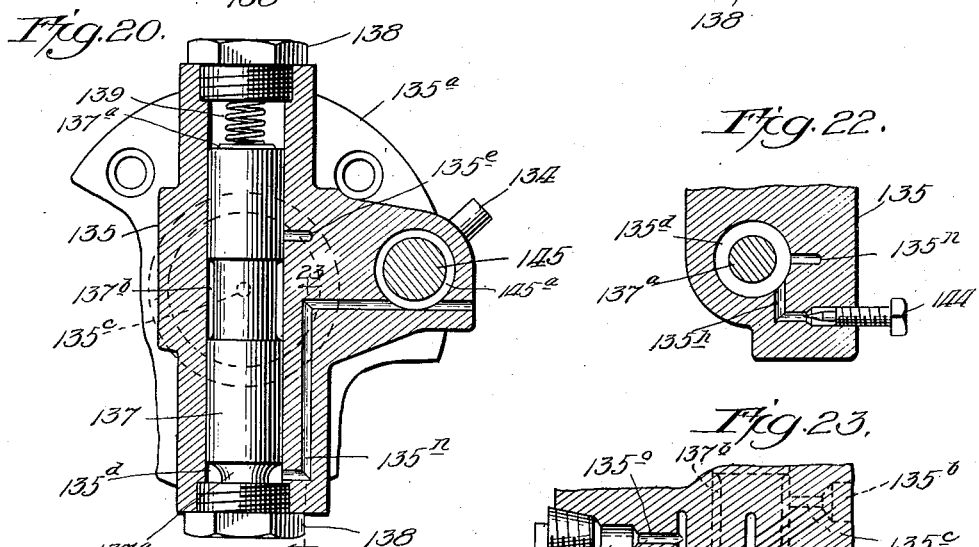
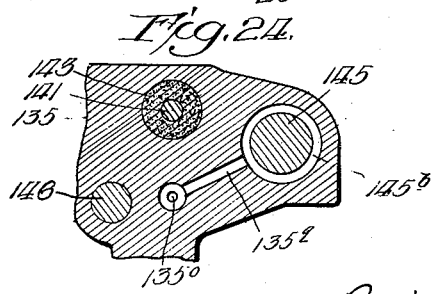
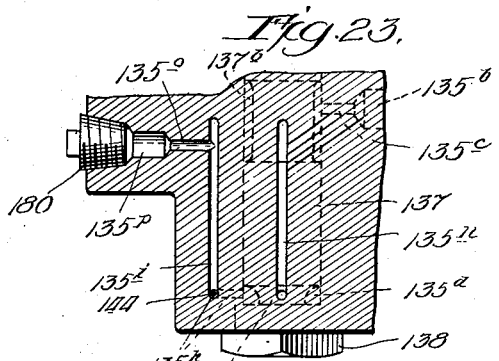
Inventor:
Herman Goldberg
by Davis, Lindsey, Smith & Shonts,
Attys.

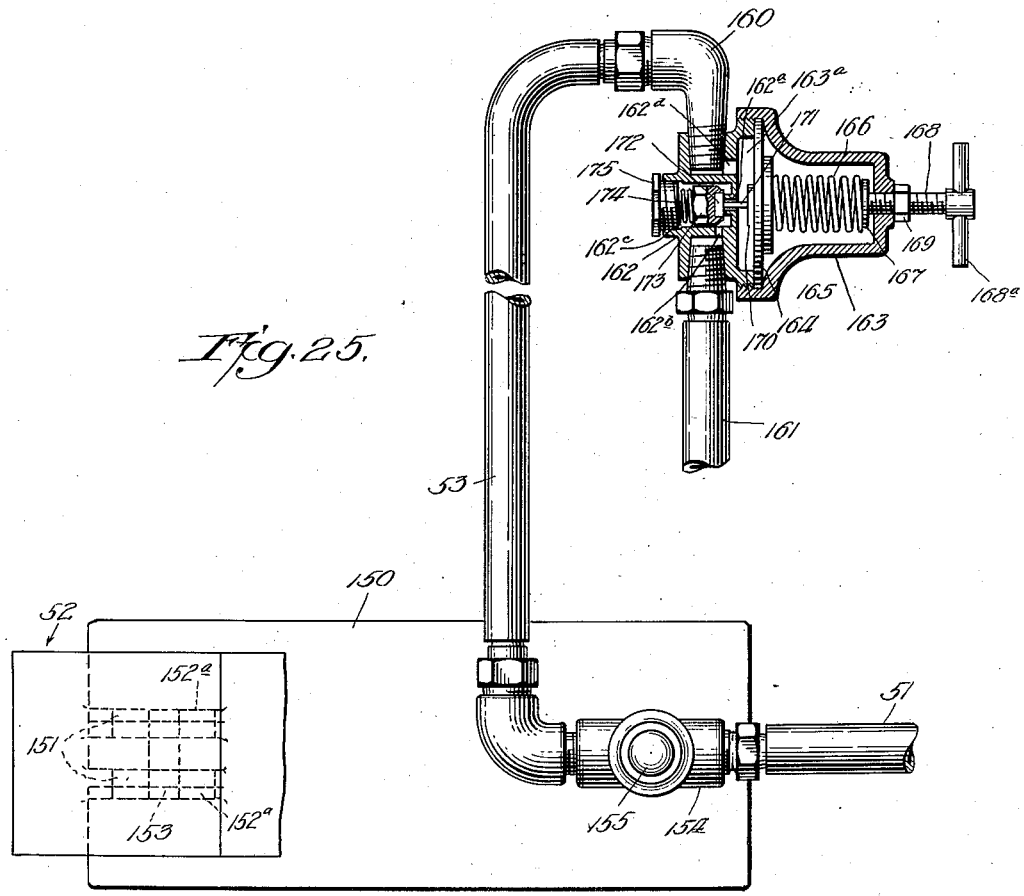
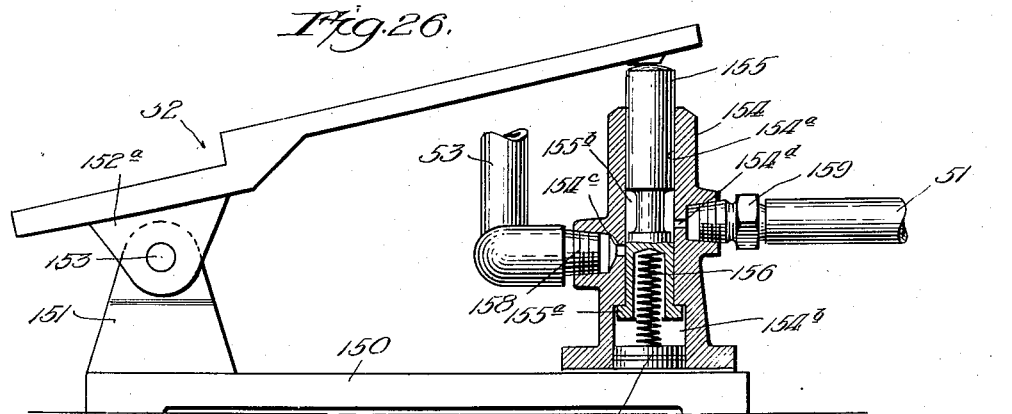

July 22, 1941.  H. GOLDBERG  2,249,758
NUT TAPPING MACHINE
Filed Feb. 19, 1938  12 Sheets-Sheet 11
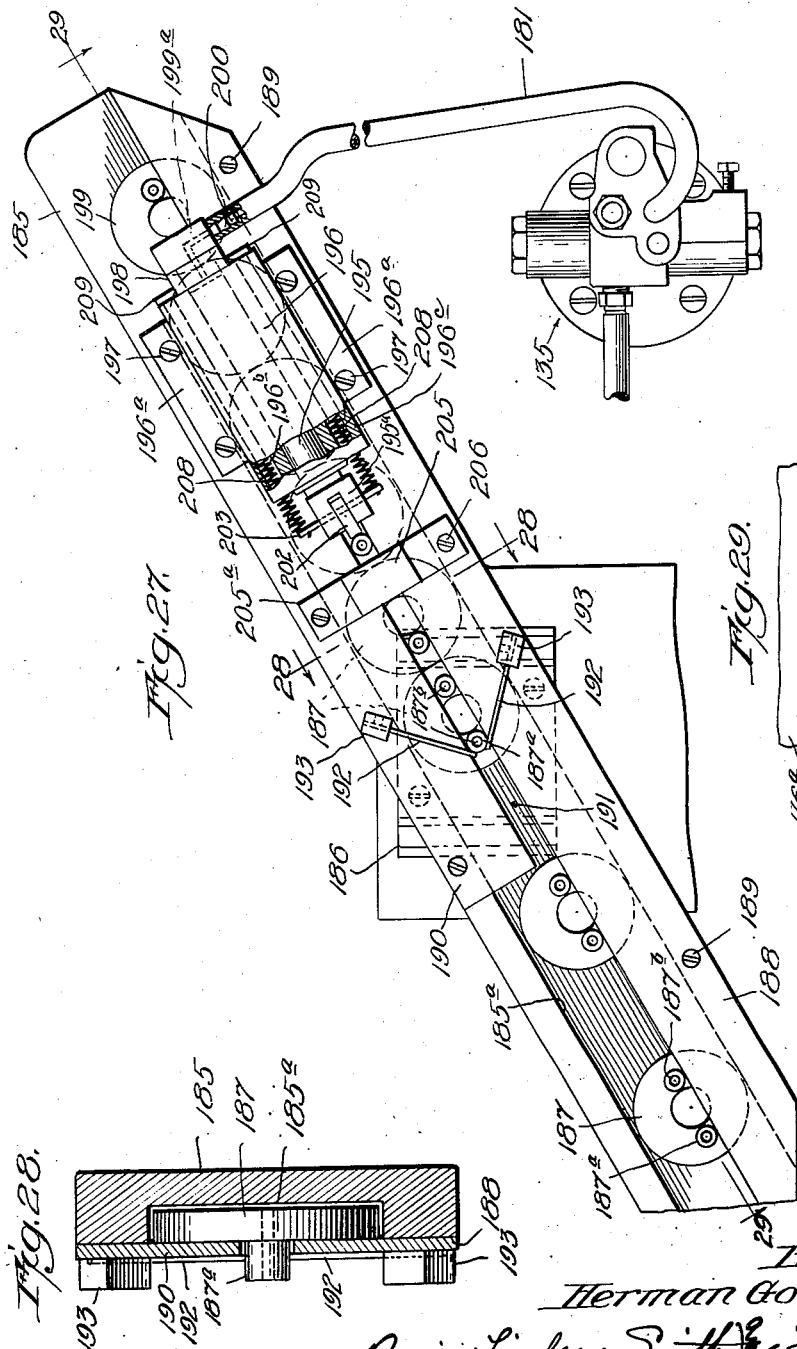
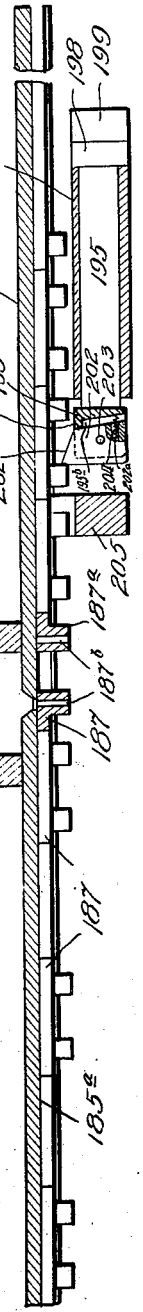
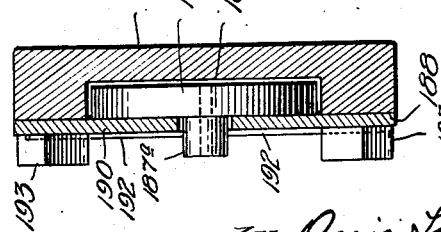
Inventor:
Herman Goldberg.
by Davis, Lindsey, Smith & Shonts,
Attys.

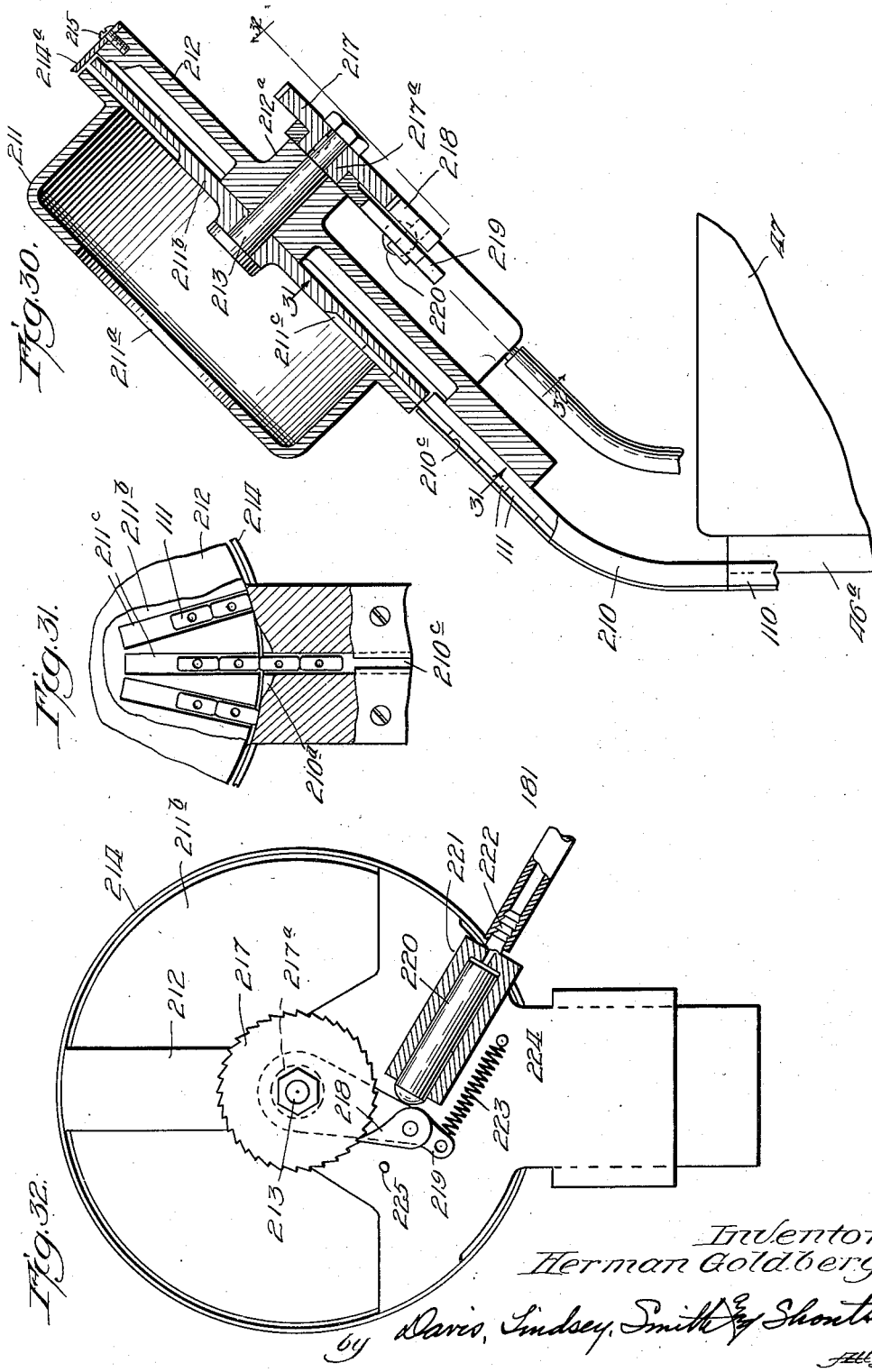

Patented July 22, 1941

2,249,758

UNITED STATES PATENT OFFICE 2,249,758

NUT TAPPING MACHINE

Herman Goldberg, Chicago, Ill.

Application February 19, 1938, Serial No. 191,386

25 Claims. (Cl. 10—139)

This invention relates to improvements in machines for tapping nuts and the like or in performing other operations in which a rotating tool is brought periodically into engagement with the work or with successive pieces of work, and its purpose is to provide an improved machine which is capable of performing these operations more perfectly, quickly, and efficiently than has heretofore been possible.

Machines of this general type have heretofore been provided in which a relative movement has been effected between a rotating tap or other tool and a device adapted to hold a nut blank or other object to be worked upon but most of these prior nut tapping machines which have gone into use have been of the bent-shank type in which the nut blanks to be tapped are fed over a tapping tool having a bent shank, the tool being held by engagement with the surrounding nut blanks so that it has been impossible to hold the tapping portion of the tool in a sufficiently definite position to secure an accurate tapping of the nut blanks. Other commercial nut tapping machines not employing the bent shank have been limited to use in tapping relatively large nuts and their speed of operation has been comparatively slow. Although in some of these prior machines resilient means have been provided for permitting the tool-holding part or the work-holding part to yield and thereby prevent injury to the tool or other parts in the event that the work is defective or is not properly positioned for engagement by the tool, the speed of operation of most of these prior machines has been limited and considerable pressure has been exerted upon the tap or other tool and when the work is defective or not properly positioned with the result that the tap or tool has deteriorated rapidly.

The principal object of the present invention is to provide an improved machine of this type in which the holder for the nut blank or other work is moved with respect to the rotating tap or other tool by fluid pressure sufficient to effect the tapping of the nut or the performance of any other desired operation, while at the same time permitting the movement of the work holder to be arrested in case the work is defective or not properly aligned with the tool. A further object of the invention is to provide a machine for tapping nuts or performing other like operations in which the movement of the work holder toward the operating tool is effected by fluid pressure and in which means are provided for regulating the speed and duration of the forward and return strokes of the work holder so that the work to be performed may be accomplished quickly and with accuracy. Still another important object of the invention is to provide a machine of the type referred to comprising fluid pressure-operated means for automatically effecting a continuing series of forward and reverse strokes of a work holder. Another object of the invention is to provide a nut tapping machine comprising fluid pressure means for moving a work holder toward a tool, in combination with fluid pressure means for feeding the work through the work holder into a position opposite the tool. Still another object of the invention is to provide a nut tapping machine comprising improved means for feeding nut blanks or other objects into a position to be engaged by a tap or other tool. A further object of the invention is to provide improved fluid-operated mechanism for controlling the movement of the parts in a nut tapping machine or the like. Other objects relate to various features of construction and arrangement which will appear more fully hereinafter.

The nature of the invention will be understood from the following specification taken with the accompanying drawings in which one embodiment of a nut tapping machine embodying the features of the present invention is illustrated together with two forms of work-feeding mechanism adapted to be used with this machine. In the drawings, Figure 1 shows a side elevation of the improved nut tapping machine of the present invention with a portion of the frame or housing in vertical section;

Fig. 2 shows an end elevation of the machine illustrated in Fig. 1, looking toward the right as viewed in Fig. 1;

Fig. 3 shows a partial end elevation of the machine illustrated in Fig. 1, looking toward the left as viewed in Fig. 1, with a part of the housing or casing broken away and with certain parts in section;

Fig. 4 shows an enlarged axial vertical section through the reversible driving mechanism for the spindle by which the nut tap or other tool is carried;

Fig. 5 shows an enlarged vertical axial section through the head or block which carries the movable ram or piston on which the work holder is mounted, the section being taken on the line 5—5 of Fig. 2;

Fig. 6 is a vertical section taken on the line

Figure 1:
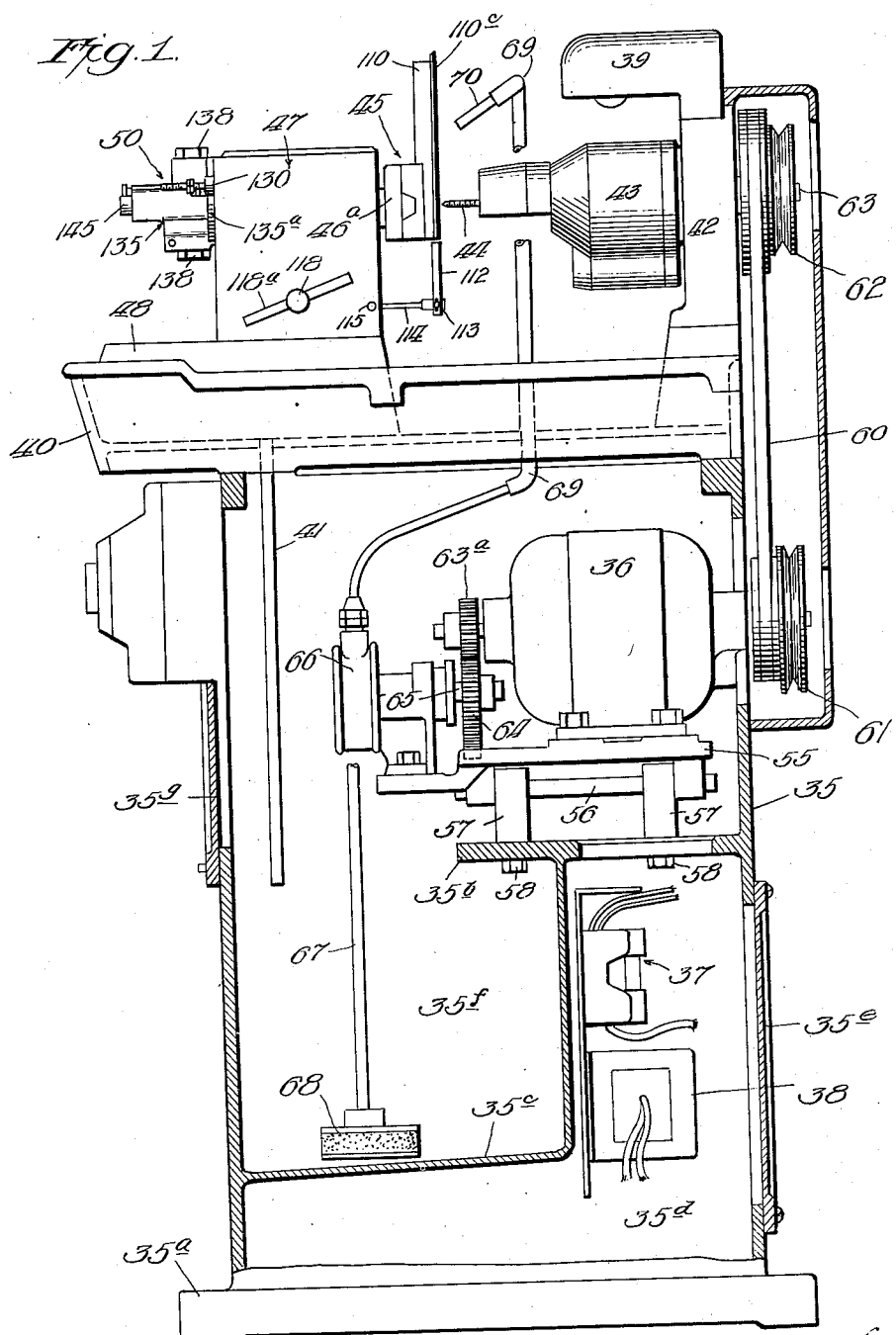

6—6 of Fig. 5 showing the means for clamping the head or block on its base or support;

Fig. 7 shows an end elevation of the work holder illustrated in Fig. 5, looking toward the left as viewed in Fig. 5;

Fig. 8 shows a horizontal section taken on the line 8—8 of Fig. 5 showing the mounting of the work holder in the head or block by which it is carried;

Fig. 9 shows a partial top plan view of the block or head and parts carried thereby, which are illustrated in Figs. 5 and 8, with a portion thereof illustrated in horizontal section to show the valve-operating rod which is actuated by the movement of the work holder;

Fig. 10 shows an enlarged end elevation of the upper part of the adjustable head and the valve mechanism carried thereby for controlling the movement of the work holder, the view being taken looking toward the right in Fig. 1;

Fig. 11 shows a top plan view of the parts illustrated in Fig. 10;

Fig. 12 shows a side elevation of the parts illustrated in Figs. 10 and 11, looking toward the left as viewed in Fig. 10;

Fig. 13 shows a vertical longitudinal section on the line 13—13 of Fig. 11;

Fig. 14 shows a transverse vertical section taken on the line 14—14 of Fig. 13;

Fig. 15 shows a horizontal section taken on the line 15—15 of Fig. 10;

Fig. 16 is a sectional view taken on the line 16—16 of Fig. 10;

Fig. 17 is a sectional view similar to that of Fig. 15 showing the relative positions of the parts when the ram or piston is in its forward position wherein the work is in engagement with the tap or other tool;

Fig. 18 is a detail sectional view taken on the line 18—18 of Fig. 10;

Fig. 19 is a vertical section taken on the line 19—19 of Fig. 18, showing the relative positions of the parts when the actuating fluid is admitted to the valve casing to cause actuation of the valve plunger;

Fig. 20 is a sectional view on the line 20—20 of Fig. 17, showing the relative positions of the parts for permitting the exhaust to the atmosphere of the fluid by which the valve plunger is actuated;

Fig. 21 is a sectional view taken on the line 21—21 of Fig. 16;

Fig. 22 is a detail section taken on the line 22—22 of Fig. 19;

Fig. 23 shows a sectional view taken on the lines 23—23 of Figs. 17 and 20;

Fig. 24 is a sectional view taken on the line 24—24 of Fig. 17, showing the means for exhausting the fluid from the auxiliary work-feeding mechanism;

Fig. 25 shows a top plan view of the foot pedal-operated mechanism for controlling the admission of fluid to the valve mechanism by which the movement of the work holder is controlled, with parts thereof shown in section;

Fig. 26 shows a side elevation of the foot pedal and valve illustrated in Fig. 25 with parts of the valve shown in vertical section;

Fig. 27 is an end elevation, similar to that of Fig. 7, of a modified form of work holder and of the valve mechanism illustrated in Fig. 1, the arrangement being such that the feeding of the work is effected by fluid pressure controlled by the valve mechanism which controls the movement of the work toward the tap or other tool;

Fig. 28 shows an enlarged transverse section taken on the line 28—28 of Fig. 27;

Fig. 29 shows a longitudinal section on the line 29—29 of Fig. 27;

Fig. 30 shows a vertical section through another form of work holder adapted to be actuated by fluid pressure controlled by the valve mechanism illustrated in Figs. 12 to 24, inclusive;

Fig. 31 is a detail section taken on the line 31—31 of Fig. 30, showing the means for feeding nuts into the channel of the feeding device; and Fig. 32 shows a sectional view on the line 32—32 of Fig. 30.

As illustrated in the drawings, the invention is shown as comprising a frame or housing 35, of rectangular horizontal cross section, which is provided with a base 35ᵃ adapted to be secured to a floor or other support. This frame or housing has formed integrally therewith an internal shelf or plate 35ᵇ adapted to serve as a support for an electric motor 36 which is used to drive the rotating tap or other tool of the machine and also to actuate a pump by which a cooling fluid is sprayed upon the work at the point where it is engaged by the tool. An angular partition 35ᶜ extends downwardly from the shelf 35ᵇ and then transversely to the opposite end wall of the housing, thus forming a chamber 35ᵈ adapted to contain fuses 37 and other devices 38 which are connected in the circuit of the motor 36, this chamber being accessible through an opening normally closed by a removable cover plate 35ᵉ. The angular partition 35ᶜ also forms a well or receptacle 35ᶠ which is adapted to contain a supply of cooling fluid to be sprayed upon the work when the machine is in operation. Access to the well 35ᶠ may be had through an opening normally closed by a removable cover plate 35ᵍ.

The upper end of the frame or housing 35 has mounted thereon a cast metal pan 40 which is adapted to receive the tapped nuts or other pieces of work, as they are produced by the operating parts of the machine, and also the cooling fluid which is returned therefrom through a pipe 41 into the well 35ᶠ. A standard or pedestal 42 extends upwardly from one end of the pan 40 and supports the reversible driving mechanism 43, driven by the motor 36, which actuates the rotatable tap or other tool 44. An electric light 39 may be mounted on the upper end of the pedestal to illuminate the tap and the work. A work holder 45 is adapted to move the nut blanks or other work into engagement with the tap or tool 44. This work holder 45 is carried by a ram or piston 46 slidably mounted in a block or head 47 which is adjustably mounted upon a base block 48 carried by the pan 40 at the end thereof opposite the standard 42. The movement of the piston 46 in the head 47 is brought about by fluid pressure controlled by valve mechanism 50 mounted on the end of the head. A fluid under-pressure is supplied to the valve mechanism 50 through a pipe 51 leading from a foot-operated valve 52. A supply pipe 53 leads to the valve 52 and the pressure in this supply pipe is controlled by a pressure regulator 54.

Having thus referred generally to the principal parts of the apparatus, the mounting of the electric motor 36 and the construction of the parts actuated thereby will be more fully described. As shown in Figs. 1 and 3, the motor 36 is mounted upon a supporting plate 55 which has one side thereof pivoted on a pin 56 which is carried by posts 57 secured by studs 58 to the flange or shelf 35ᵇ of the housing. The opposite edge of the supporting plate 55 is threadedly engaged by a stud 59 which has its head resting upon the flange 35ᵇ formed on the wall of the housing 35. By adjusting the stud 59 the supporting plate 55 may be rocked about its pivot for the purpose of varying the elevation of the motor 36 and thereby adjusting the tension of the belt 60 which connects the driving pulley 61 mounted on the motor shaft with the driven pulley 62 mounted upon the driving shaft 63 of the reversible driving mechanism 43 heretofore referred to. Both of the pulleys 61 and 62 have double grooves of different diameter so that by shifting the belt from one pair of grooves to the other the speed of operation of the driving mechanism 43 may be varied with a given speed of the motor, and other graduations of speed may be obtained by varying the speed of the motor. The other end of the motor shaft has mounted thereon a pinion 63ᵃ which meshes with a gear 64 fixed on a shaft 65 which is journaled in the casing of a pump 66. This pump has an inlet conduit 67 provided at its lower end with a straining device 68 through which the cooling fluid, such as an oil emulsion or the like, is pumped upwardly from the well 35ᶠ preliminary to being discharged by the pump through an outlet conduit 69 which discharges through a nozzle 70 onto the work in a position opposite the end of the tap or other tool 44.

The reversible driving mechanism by which the tap or tool 44 is operated is shown particularly in Fig. 4. As there illustrated, the driving shaft 63, actuated by the motor 36 through the belt 60, is mounted to revolve in two ball-bearing units 72 and 73 which are mounted within the hub portion 74ᵃ of the end wall 74ᵇ of the casing 74 which contains the reversible driving mechanism. The ball-bearing unit 72 is retained against a shoulder of the hub portion 74ᵃ by a ring nut 75 which is threaded into the end of the portion 74ᵃ. The two ball-bearing units are spaced apart by a sleeve 76 surrounding the driving shaft 63 and a sleeve 77 spaces the ball-bearing unit 72 from the double groove pulley 62 which is mounted on the reduced end of the shaft and held in position thereon by a nut 78. The ball-bearing unit 73 seats against a shoulder formed on the end of the driving shell 80 which is formed integrally of the inner end of the driving shaft 63. The internal annular face of this driving shell is adapted to engage one of the correspondingly inclined annular faces 81ᵃ of the driven shell 81 which is mounted on the driven shaft or spindle 82 by which the tap or other tool 44 is carried. The driven shell 81 has another inclined annular face 81ᵇ which is adapted to be engaged by the correspondingly inclined annular face on a reverse driving shell 83 which has a hub 83ᵃ surrounding the shaft 82 and which is adapted to be driven in a direction opposite to the direction of rotation of the driving shell 80 through intermediate gearing connections.

The reduced extremity 82ᵃ of the spindle is journaled in a ball-bearing unit 84 which is mounted in a recess formed in the hub portion of the driving shell 80. At the other end of the casing 74, the spindle 82 has fixed thereon a sleeve 85 which is journaled in a ball-bearing unit 86 mounted in the hub portion 74ᶜ of the casing. This ball-bearing unit is held in place against an annular shoulder of the hub by a ring nut 87 which threadedly engages the internal bore of the hub. The hub portion 83ᵃ of the reverse driving shell 83 is journaled in a ball-bearing unit 88 which is mounted in the inner enlarged portion of the hub 74ᶜ, being held in place against an annular shoulder within the hub by means of an annular plate 89 which is secured to the inner end face of the hub by screws 90. A gear 91 is fixed on the hub 83ᵃ of the reverse driving shell between the radial disk portion thereof and the ball-bearing unit 88 and this reverse driving shell is held against endwise movement within the bearing unit 88 by means of a pair of ring nuts 92 which are mounted on the threaded end of the hub portion 83ᵃ.

The driven shell 81 has an inwardly extending spider portion 81ᶜ which fits over a member 93 secured to the spindle 82 by a transverse pin 94. The spider portion 81ᶜ is clamped against the flange 93ᵃ of the member 93 by a pair of ring nuts 95 which threadedly engage the reduced portion 93ᵇ of the member 93. The driven shell 81 is thus detachably secured in place on the spindle and this shell and the spindle are normally moved toward the right, as viewed in Fig. 4, by a coil spring 96 so that the annular frictional surface 81ᵃ of the driven shell is in engagement with the correspondingly tapered driving surface of the shell 80 to cause the spindle and the tap to be rotated normally in a tapping direction. If preferred, the spring 96 may be so selected that it will normally hold the driven shell 81 in a neutral position wherein its frictional surfaces 81ᵃ and 81ᵇ will be out of contact with the respective shells 80 and 83 which they are adapted to engage. One end of the spring 96 bears against the sleeve 85 and the other end is detachably secured to the spindle 82 by a split ring 97 engaging a groove in the spindle.

For the purpose of causing a reverse rotation of the shell 83, as compared with the direction of rotation of the driving shell 80, the shell 80 is provided around its periphery with a gear 99 which meshes with the teeth 100ᵃ of a double gear 100 which is journaled in ball-bearing units 101 mounted on a fixed shaft 102 secured in the lower part of the casing 74. This gear has another series of teeth 100ᵇ which mesh with the teeth of an intermediate gear 103 mounted to revolve on a stub shaft 104 secured in the inner end of the hub portion 74ᶜ of the casing. This intermediate gear in turn meshes with the teeth of the gear 91 carried by the reverse driving shell 83 so that this shell is driven in a direction opposite to the direction of rotation of the shell 80. When a pull is exerted on the spindle 82 toward the left, as viewed in Fig. 4, the spring 96 is compressed and the driven shell 81 is moved into engagement with the reverse driving shell 83 so that the spindle is then driven in a reverse direction adapted to effect the withdrawal of a tap from a tapped nut, for example. For the purpose of holding the tap 44, the end of the spindle 82 is provided with an enlarged socket portion 82ᵇ having mounted therein a collet 105 which is split longitudinally, as shown at 105ᵇ, to permit the parts thereof to be contracted about the shank of the tap when the outer nut 105ᶜ is tightened on the collet 105 by screwing it onto the threaded portion 82ᶜ of the socket portion 82ᵇ. The end portions of the collet 105 are provided with inclined wedging surfaces 105ᵉ and 105ᶠ. The surface 105ᵉ is adapted to be engaged by a correspondingly inclined annular surface 105ᵍ formed on the outer nut portion 105ᶜ and the other surface 105ᶠ engages the annular inclined surface 82ᵈ on the socket member, so that when the nut is tightened it wedges the tapered portions of the collet into a tight engagement with the shank of the tap.

As shown in Figs. 1, 5, 6, 7, and 8, the work holder 45 by which the work is moved toward and from the tap 44 comprises a vertical guide member 110 having an under-cut guide channel 110a in which the nut blanks or other pieces of work 111 are adapted to slide downwardly to a position opposite the tap 44. In the embodiment shown in Figs. 1, 5, 7, and 8, the blanks 111 are adapted to be fed by hand into the upper end of the guide channel 110a which is slightly enlarged at this point to facilitate the insertion of the blanks. The guide channel is formed by cutting a groove in the upright bar 110b and attaching plates 110c to the face of the bar to overlie the lateral edges of the groove. These plates preferably extend slightly above the upper end of the bar to facilitate the insertion of the blanks in the groove. This guide member 110 is carried by a piston block 46a which is formed integrally with the piston 46 by which the holder 45 is moved bodily toward the tap 44. When the piston and the holder are in their retracted positions, shown in Fig. 5, the lowermost blank 111a, which will have been tapped in the next preceding operation of the machine, rests upon a supporting member 112 and the next blank 111b above it will then occupy a position opposite the tap 44 which is adapted to pass through an aperture 110d formed in the holder as the tapping of the blank takes place. As the holder 45 is moved longitudinally of the tap 44 during the tapping operation, the lower tapped blank 111a will be moved off of the support 112 and will then drop by gravity into the collecting pan 40. When the holder 45 is again retracted, the blank which has just been tapped will then drop into position on the support 112 and the next blank of the series will move to a position to be tapped. The support 112 is provided with a bifurcated lower end 112a and the opposite arms of this portion are provided with elongated slots 112b so that the member 112 may be clamped in adjusted vertical position by a bolt 113 engaging the head portion of a supporting pin 114. This pin engages an aperture in the head 47 by which the piston 46 is carried, and is secured in adjusted position by a set screw 115. By this arrangement, the supporting member 112 may be adjusted vertically and horizontally to accommodate pieces of work and work holders of different sizes.

The head 47 is also capable of adjustment on its supporting base 48 in order to accommodate different pieces of work. For this purpose, the lower flat faces 47a of the head are mounted to slide on the base in a direction longitudinally of the axis of the tap 44 and the head is arranged to be clamped in adjusted position on the base by means of a cap screw 116 which threadedly engages a member 117 having an aperture to receive a clamping member 118. This clamping member is in the form of a shaft or pin journaled in apertures formed in opposite side walls of the head, as shown in Fig. 6, and having a transverse handle 118a on its end. This clamping member is provided adjacent its opposite end with an annular groove 118b which is engaged by the extremity of a set screw 119 threadedly engaging an aperture in the lower part of the side wall of the head, thus preventing endwise movement of the clamping member. The clamping member is further provided between its ends with an eccentric portion 118c which is the part lying within the aperture of the member 117. The cap screw 116 has its head 116a mounted in a longitudinal under-cut groove 48a formed in the base 48 and by suitably adjusting the member 117 on the stud 116, the position of the member 117 may be so regulated that by turning the clamping member 118, the eccentric portion 118c thereof will cause the head 47 to be securely clamped on the base.

As shown in Figs. 5 and 8, the piston 46, which carries the work holder 45, is mounted to slide in a bushing 120 mounted in the tubular bore or cylinder 47b which is formed in the head. The block 46a which is formed on the outer end of the piston 46 has the lower part of the guide 110 secured thereto by screws 121 and this block also is provided with sockets in which are fixed a pair of guide pins 123 arranged to slide in apertures 47c which are formed in the bosses 47d of the head. The piston block 46a is thus guided in a straight line and is prevented from turning about the axis of the piston. The piston 46 is somewhat shorter than the bore in which it is mounted and its motion toward the tap 44 is effected by the admission of compressed air or other fluid to the space at the end of the piston. The motion of the piston and the work holder in the opposite direction, after the tap 44 or other tool has performed its function, is brought about by a pair of coil springs 125 which are mounted within the cavity of the head 47 on opposite sides of the piston, as shown in Fig. 8. The piston block 46a has threaded therein a pair of headless studs 126 which loosely engage apertures 47e in the head and which are threaded into engagement with the springs 125. The other ends of these springs are threaded into engagement with other studs 127 which are mounted in apertures at the other end of the head. When the piston 46 moves toward the right under fluid pressure, as viewed in Fig. 8, the springs 125 are extended, but when the fluid pressure is relieved the springs 125 contract and thus bring about a return motion of the work holder 45. This return motion of the work holder causes the tapped nut to exert a pull on the tap 44 with the result that the spindle 82 is shifted toward the left, as shown in Fig. 4, causing the driven shell 81 to move into engagement with the reverse driving shell 83 so that the tap is then rotated in the proper direction to effect its withdrawal from the nut.

In addition to the parts heretofore described, the piston block 46a also has secured thereto a valve-actuating rod 130 which engages an aperture in one side of the block, being secured therein by a set screw 131, as shown in Fig. 9. This valve-actuating rod slidably engages apertures in the end walls of the head 47 and the threaded end portion 130a thereof has mounted thereon a washer 132 and a pair of lock nuts 133 forming between them a gap 130b which is loosely engaged by a pin 134 which is adapted to be moved by the rod 130 to control the valve mechanism in the valve block 135 by which the admission of compressed fluid to the bore or cylinder 47b is controlled.

The valve block 135 comprises a circular flange 135a which is secured to the end face of the head 47 by studs 136, as shown in Fig. 10. This block has formed or mounted therein a series of passages and a plurality of valve members for controlling the admission to the end face of the piston 46 of the fluid pressure which is supplied through the conduit 51 heretofore described. As shown particularly in Fig. 13, the valve block 135 has a part of reduced diameter which fits the end of the bore 47b in the head 47 and the block has formed therein a passage 135b which communicates at one end with the chamber in which the piston 46 is mounted and at the other end with a smaller passage 135c which leads to a vertical bore or cylindrical passage 135d formed in the valve block and having mounted therein a valve plunger 137. This valve plunger is of general cylindrical form with tapered portions 137a at its ends which are adapted to engage the plugs 138 mounted in the ends of the bore 135d when the valve plunger is at the extreme limits of its travel. Between its ends, the plunger 137 is provided with a wide annular groove 137b which forms an annular chamber adapted to communicate with the passage 135c for supplying fluid to the piston 46 when that fluid is admitted to the chamber 137b. This plunger 137 also has an axial bore 137c which contains a coil spring 139 having its upper end in engagement with the upper plug 138 so that the spring is compressed when the plunger 137 is in its uppermost position, as shown in Fig. 13. When in this position, the chamber formed by the annular groove 137b is adapted to receive compressed fluid and to supply it to the piston 46, the fluid being supplied to the chamber 137b through an angular passage 135e which, as shown in Fig. 18, communicates with a larger passage 135f having communication with a transverse passage 135g through which the compressed fluid is supplied from the conduit 51 through a coupling 140. The admission of fluid from the passage 135g to the angular passage 135e is controlled by a pin valve 141 which, in its closed position, seats upon the shoulder at the junction of the passage 135e with the larger passage 135f. The pin valve 141 has an enlarged threaded portion 141a which threadedly engages a packing gland 142 threaded into an aperture in the end of the block 135 and arranged to compress a body of packing material 143 about the surface of the pin valve to provide a fluid-tight joint. This pin valve has a non-circular extremity 141b which may be engaged by a wrench or the like for adjusting it to vary the rate of admission of compressed fluid to the angular passage 135e.

The coil spring 139 normally maintains the valve plunger 137 in its lower position, shown in Figs. 19 and 20, in which position it prevents the flow of compressed fluid from the passage 135e to the passage 135c. In order to establish communication between these passages 135c and 135e through the annular groove 137b formed in the valve plunger, it is necessary to move the valve plunger upwardly to the position shown in Fig. 13 and that is effected by admitting compressed fluid to the lower end of the bore 135d. For this purpose, a horizontal passage 135h is arranged to communicate with the lower end of the bore 135d and this horizontal passage communicates with an angular passage 135i, the communication being controlled by a pin valve 144 which is threaded into an aperture in the side of the valve block, as shown in Fig. 19. The angular passage 135i is adapted to receive compressed fluid from an extension of the horizontal passage 135g to which compressed fluid is supplied by the conduit 51 and the communication between these two passages 135g and 135i is controlled by a sliding valve member 145 having mounted therein the previously described pin 134 which is actuated by the valve rod 130 when the piston 46 moves in either direction. The valve member 145 is in the form of a cylinder slidably mounted in a bore 135j formed in the valve block 135 and the pin 134 projects outwardly through a slot 135k, as shown in Figs. 15, 16, and 17. The valve member 145 is provided with an annular groove 145a which, when the valve member is in the position shown in Figs. 15, 18, and 19, establishes a communication between the passage 135g and the passage 135i. This position of the valve member 145 corresponds to the retracted position of the piston 46 and the work holder 45, and when the valve member reaches that position the compressed fluid flows through the communicating passages 135g, 145a, 135i, and 135h, as shown in Fig. 19, to the lower end of the bore 135d, thereby actuating the valve plunger 137 and moving it upwardly to the position shown in Fig. 13, thus causing the annular groove 137b to establish a direct communication between the passages 135c and 135g, with the result that the compressed fluid is admitted to the cylinder 47b and the piston 46 is actuated to move the work holder toward the rotating tap. When a nut blank in the holder engages the end of the tap, the driven shell 81 will be moved into engagement with the driving shell 80 (if it is not normally in engagement therewith under the influence of the spring 96) and the tap will rotate to tap the nut blank as the work holder continues its movement in the same direction. At the end of the stroke of the piston 46, the nut blank will have been tapped, assuming that the head 47 has previously been properly adjusted and that the tap 44 is of the proper length for the work. The piston 46 and its head 46a then begin their return movements under the influence of the springs 125, thus causing the tapped nut to exert a pull on the tap and thereby move the driven shell 81 into engagement with the reverse driving shell 83 so that the tap is then rotated in the reverse direction and unscrewed from the tapped nut as the work holder is withdrawn.

During this reverse movement of the piston 46 and the work holder 45, the compressed fluid which has been admitted to the chamber of the piston 46 and the compressed fluid which has been admitted to the lower end of the valve 137 must be exhausted to allow these parts to return to their normal positions. The exhaust of compressed fluid from the bore 47b in which the piston 46 is mounted takes place through a passage 135l which leads from the bore 135d and communicates with a transverse passage 135m arranged to communicate with the atmosphere, as shown in Figs. 13 and 16. The size of the opening at the mouth of the passage 135l is regulated by a needle valve 146 which is threaded into an aperture in the end of the valve block so that it may be adjusted to regulate the rate of escape of the compressed fluid. The passage 135l is adapted to communicate with the passages 135b and 135c through the annular chamber formed by the groove 137b in the valve plunger and it will be apparent that this communication is established when the plunger 137 reaches its lowermost position, shown in Figs. 12, 19, and 20.

In order to permit this exhaust from the bore 47b in which the piston 46 is mounted, it is necessary first to exhaust the compressed fluid from the chamber 135d in which the plunger 137 is mounted and this is brought about through exhaust connections which are controlled by the valve member 145. As shown in Fig. 20, the lower end of the chamber 135d communicates with an angular passage 135n, the upper horizontal portion of which opens to the atmosphere but is normally closed by a portion of the valve member 145. When the plunger 145 is in its forward position, as shown in Fig. 17, corresponding to the forward position of the work holder 45, the previously mentioned groove 145ª in the valve member registers with the upper horizontal portion of the passage 135ⁿ, as shown in Fig. 20, thus permitting the compressed fluid to exhaust from the chamber 135ᵈ and allowing the plunger 137 to return to the position shown in Fig. 20 under the influence of the spring 139.

During the exhaust of the compressed fluid from the lower end of the bore 135ᵈ and while the plunger 137 is returning to its lower position, shown in Fig. 20, the piston block 46ª continues its return stroke under the influence of the springs 125 and the rod 130 functions to move the valve member 145 to the position in Figs. 15, 16 and 19, wherein a connection is again established between the passages 135ᵍ and 135ⁱ through the groove 145ª in the valve member so that the plunger 137 is again moved upwardly against the compression of the spring 139 and the cycle of operations is repeated.

These repeated operations of the plunger 137 and the resulting successive operations of the piston 46 and the work holder 45 occur, however, in response to the admission of compressed fluid to the valve block 135 through the supply conduit 51, previously referred to, and the flow through this conduit is controlled by the foot-operated valve 52 which may be actuated by the operator to cause a flow of compressed fluid to the valve block continuously or only at the times when it is desired to produce feeding movements of the work holder 45. As shown in Figs. 2, 25, and 26, the foot-operated valve 52 comprises a base 150 adapted to be secured to the floor or other support adjacent the base 35ª. This base plate 150 has mounted thereon an upwardly extending pedestal 151 upon which the foot pedal 152 is pivoted through depending ears 152ª and a pivot pin 153. At the other end of the base plate 150, there is mounted an upwardly extending valve block 154 which has formed therein a vertically extending cylindrical bore 154ª in which is mounted a cylindrical valve member 155. This valve member is provided with a rounded upper extremity on which the free extremity of the foot pedal 152 rests so that when pressure is exerted on the pedal the valve member is forced downwardly against the compression of a coil spring 156 which is seated in a recess in the lower end of the valve member and which has its lower end engaging a removable disk 157 detachably secured in the lower end of the enlarged chamber 154ᵇ which communicates with the bore 154ª and which receives the annular flange 155ª formed on the lower end of the valve member. The spring 156 thus normally forces the valve member to its uppermost position, shown in Fig. 26, wherein the annular flange 155ª engages the annular shoulder at the upper end of the chamber 154ᵇ.

The valve block 154 is provided on opposite sides with two offset ports 154ᶜ and 154ᵈ, the first of which communicates through a coupling member 158 with the supply conduit 53, previously described, while the other port 154ᵈ communicates through a coupling member 159 with the conduit 51 which leads to the valve block 135. When the valve member 155 is forced downwardly by depressing the pedal 152, the two ports 154ᶜ and 154ᵈ are connected through the chamber formed by the wide annular groove 155ᵇ which is formed in the valve member 155. Thus, as long as the foot pedal 152 is depressed, there is a continuing supply of compressed fluid to the valve mechanism by which the forward movements of the work holder 45 are controlled. The conduit 53, which supplies compressed fluid to the foot-operated valve 52, is in turn supplied with compressed fluid through the pressure regulator 54, previously referred to. This pressure regulator is mounted for convenience adjacent the upper part of the housing 35, as shown in Fig. 2, and is connected through a short outlet pipe 160 with the upper end of the conduit 53. The compressed fluid is supplied to the pressure regulator 54 through another pipe 161 leading from an air compressor or other source of compressed fluid supply. As shown particularly in Fig. 25, the pressure regulator 54 comprises two casings 162 and 163, which have threaded engagement with each other and which are adapted to clamp between them a resilient diaphragm 164. A plate 165 is mounted on one side of the diaphragm 164 and a coil spring 166 is mounted between this plate and a collar 167 which is mounted on one end of an adjusting screw 168. This adjusting screw threadedly engages the end of the casing 163, and has a handle 168ª which permits the screw to be turned to regulate the compression of the spring 166 and a lock nut 169 may be used to secure the screw 168 is adjusted position. In this manner, it is possible to regulate the initial compression of the spring 166 which must be overcome by the upward movement of the diaphragm 164 under the influence of the compressed air or other fluid which is admitted to the pressure regulator through the pipe 161. A disk 170 is secured to the face of the diaphragm 164 and this disk is connected by a valve stem 171 with a valve member 172 which is adapted to control the admission of compressed fluid through the port 162ª into the chamber 163ª adjacent the diaphragm. The valve member 172 carries a block 173 which is engaged at its opposite ends by a coil spring 174 capable of being adjusted by a plug 175 threadedly engaging an aperture in an end of the casing 162. By adjusting this plug, the compression of the spring 174 may be varied to regulate the pressure with which it normally causes the valve member 172 to engage its seat around the port 162ª. The compressed air or other fluid which is supplied through the pipe 161 is admitted through a port 162ᵇ to the chamber 162ᶜ which is on the inlet side of the valve member 172. The back pressure of the fluid in the pipe 160 communicates with the chamber 163ª adjacent the diaphragm through a port 162ᵈ. When this back pressure, which is the pressure at which the compressed fluid is supplied to the foot-operated valve 52, falls as a result of the flow of fluid to the valve block 135, the diaphragm 164 is moved by the spring 166 with the result that the valve 172 opens the port 162ª thereby admitting additional compressed fluid from the supply pipe 161 to the chamber 163ª adjacent the diaphragm. The diaphragm is then moved against the compression of the spring 166, thereby causing the valve 172 to be moved again to its closed position. This additional supply of compressed fluid which is thus admitted to the chamber 163ª passes through the pipe 160 and the conduit 53 to the foot-operated valve 52. By suitably adjusting the springs 166 and 174 of the pressure regulator, the frequency and extent of opening of the port 162ª by the valve 172 may be regulated in order to maintain any desired pressure of the fluid supply to the foot-operated valve 52. This pressure may be conveniently indicated by a pressure gauge 177 located above the level of the pan 40, as shown in Fig. 2, and connected by a pipe 178 with the T-connection 179 through which the pipe 160 is connected with the conduit 53.

In the embodiment of the invention thus far described, the nut blanks or other articles to be operated upon by the machine are fed into the guide member of the work holder by hand but provision is made for utilizing the fluid pressure in the apparatus to operate automatic feeding means so that the blank pieces of work are fed continuously into the work holder without attention on the part of the operator. For this purpose, the valve block 135 is provided with auxiliary passages by which compressed fluid may be supplied to the work feeding mechanism and exhausted therefrom after each feeding operation. These passages include an auxiliary supply passage 135° which leads from the vertical portion of the passage 135¹ to an enlarged horizontal passage 135ᵖ having an enlarged outer end which is normally closed by a plug 180 when the work-feeding mechanism is not in use but which may be connected to this work-feeding mechanism by a flexible conduit 181, shown in Fig. 27, which may be connected to the passage 135ᵖ through a suitable threaded nipple. With this arrangement, the adjustment of the valve member 145 to a position wherein compressed fluid is admitted to the lower end of plunger 137, as shown in Fig. 19, also permits compressed fluid to flow through passages 135° and 135ᵖ to the conduit 181 by which the fluid is admitted to the work-feeding mechanism. After each operation of the work-feeding mechanism, the compressed fluid which has actuated that mechanism is exhausted through the conduit 181 and the passage 135ᵖ, the valve block 135 being provided with another passage 135ᵠ, shown particularly in Figs. 16 and 24, which extends at right angles to the passage 135ᵖ and which is normally closed by the valve member 145. When the valve rod 130 moves the valve member 145 forwardly to the position shown in Fig. 17, the auxiliary exhaust passage 135ᵠ communicates with the annular groove 145ᵇ formed in the valve member 145, as shown in Fig. 24, so that the two portions of the passage 135ᵠ are then connected through this annular groove to permit the compressed fluid in the passage 135ᵖ, conduit 181, and parts connected thereto, to exhaust to the atmosphere, which will allow the work-feeding mechanism to be restored to its initial condition. In this way, the movement of the valve member 145 in response to the movement of the work holder 45 operates to effect the actuation of the work-feeding mechanism in proper timed relation so that one operation of the work-feeding mechanism occurs between successive operations upon the work being held by the work holder 45.

In the form of feeding mechanism shown in Figs. 27, 28, and 29, means are provided for feeding articles of work successively into position to be worked upon by the rotating tool of the machine and this feeding means is actuated by fluid pressure supplied through the flexible conduit 181. This feeding means comprises a guide bar 185 mounted in an inclined or diagonal position on a member 186 carried by the piston block 46ᵃ, previously described, so that when the piston 46 is actuated the guide bar 185 is moved toward the rotating tap 44. In this case, the articles of work are in the form of circular disk-like rings 187 each having diametrically disposed bosses 187ᵃ formed thereon. These bosses have apertures 187ᵇ formed therein and these apertures are to be tapped by the tool 44. The bar 185 has formed therein a longitudinal guide channel 185ᵃ having a width slightly greater than the outer diameters of the members 187. A plate 188 is secured to the guide bar 185 along its lower edge by screws 189 and another plate 190 is secured by similar screws to the upper edge of the guide bar with the result that through a portion of the length of the guide bar the inner parallel edges of these plates form a longitudinal slot 191 having a width slightly greater than the outer diameters of the bosses 187ᵃ. An undercut guide channel is thus formed for guiding the members 187 during their travel downwardly through the guide member and the slot 191 serves to hold the bosses 187ᵃ in such positions that these bosses align with each other in successive members 187 so that they may be moved successively to a position opposite the tap 44. The plate 188 extends throughout the length of the guide bar 185 but the upper plate 190 terminates short of both ends of this guide block so that a space is provided at the upper end to permit the manual insertion of the members 187 with the two bosses on each member in alignment with the slot 191. Similarly, the termination of the plate 190 above the lower end of the guide bar provides a space through which access may be had to the tapped members 187 to facilitate their removal after they have been tapped. Each member 187 is adapted to be held in tapping position by a pair of leaf springs 192 which have their outer ends secured in blocks 193 attached to the outer faces of the plates 188 and 190. These leaf springs converge toward the lower end of the guide bar 185 and terminate sufficient beyond the inner edges of the plates 188 and 190 to prevent the normal passage between them of the bosses 187ᵃ. When pressure is exerted upon the members 187 in the upper part of the channel, the springs 192 are adapted to spread apart to permit one of the bosses 187ᵃ to pass between them, whereupon the member 187 carrying that boss slides downwardly by gravity until its next apertured boss engages the springs and is in position to be tapped.

The downward movement of the members 187 in the guide channel is effected by reciprocating feeding mechanism comprising a piston 195 mounted in a cylinder 196 which has lateral flanges 196ᵃ secured to the outer face of the guide bar by screws 197. The cylinder 196 is closed at its upper end by a head 198 and a block 199, secured to this head, carries a nipple 200 which engages the end of the flexible fluid supply conduit 181. The nipple 200 communicates through passages 199ᵃ, formed in the block and in the cylinder head, with the interior chamber of the cylinder 196 so that when compressed fluid is supplied to the cylinder through the conduit 181, the piston 195 is forced downwardly and toward the left, as viewed in Figs. 27 and 29, thus causing the feeding of a member 187 through a predetermined distance by the engagement with one of its bosses 187ᵃ of a pawl 202 pivoted by a pin 203 in a slot formed in the piston block 195ᵃ carried at the end of the piston. The pawl 202 is normally moved to the position shown in Fig. 29, by a coil spring 204 which is mounted in a recess 202ᵃ formed in the pawl and which engages at its other end the inclined wall of the slot 195ᵇ in which the pawl is mounted. The normal position of the pawl, shown in Fig. 29, is determined by lugs 196ᶜ formed on the piston head and adapted to engage the lower edge of the pawl to limit the turning of the pawl under the influence of the spring 204. These lugs, however, permit the swinging of the pawl in the opposite direction to the extent permitted by the slot 196ᵇ so that when the piston 195 is retracted after a feeding movement, the pawl 202 tilts about its pivot, thus permitting the upper inclined face 202ᵇ thereof to slide under the next boss 187ᵃ. The extent of the forward movement of the piston 195 is determined by a block 205 located in the path of movement of the piston block 195ᵃ and having lateral flanges 205ᵃ which are secured to the guide bar 185 by screws 206. Upon the forward feeding movement of the piston 195, the pawl 202 engages the block 205 to limit the feeding movement and this stop block is so located that the feeding movement will be of sufficient extent to force one of the bosses 187ᵃ past the leaf springs 192 which locate the bosses successively in positions opposite the rotating tap 44.

After each feeding movement of the piston 195 and the pawl 202, the piston is returned to its upper position by a pair of coil springs 208 which are mounted in tubular bores 196ᵇ formed in the bosses 196ᶜ which, in turn, are formed integrally with the cylinder 196. These coil springs are threaded at their upper ends onto studs 209 which engage the upper ends of the bores 196ᵇ and, at their lower ends, these springs are attached to the ends of the transverse pin 203 upon which the pawl 202 is pivotally mounted, the ends of this pin being arranged to project beyond the upper and lower faces of the piston block, as shown in Fig. 27. The coil springs 208 are thus put under tension by the feeding movement of the piston 195 and after this feeding movement has been completed, they contract to return the piston to its normal position. In this way, the bosses on successive members 187 are fed to the tapping position and it will be apparent that this feeding movement serves to position each boss in the proper location, although the spaced relation of successive bosses may vary because each boss assumes its tapping position by gravity against the ends of the leaf springs 192.

In Figs. 30, 31, and 32 of the drawings, there is disclosed another form of work-feeding mechanism in which the nut blanks or other pieces of work to be operated upon are placed in a hopper and are automatically fed to the work holder by mechanism operated by fluid pressure each time that the work holder is in its retracted position. As further shown, the work-feeding device is mounted above the head 47 and includes a guide member 210 which is curved between its ends so that the lower portion thereof operates as a continuation of the guide member 110, shown in Fig. 5, which is mounted on the piston block 46ᵃ. In this case, the guide member 210, having an undercut groove therein for the nut blanks or other pieces of work, terminates at its lower end in such a position that it is in alignment with the guide member 110 when the piston block 46ᵃ is in its retracted position. Each time the guide member 110 returns to this retracted position, one of the perforated blanks 111 to be tapped drops by gravity from the channel of the guide member 210 into the channel of the guide member 110. Upon the forward movement of the work holder 45 and the piston block 46ᵃ, the upper surface of the piston block moves beneath the lower end of the guide member 210 to prevent a nut blank from moving out of its lower end during the forward and return movements of the work holder. During these movements of the work holder, however, fluid pressure-actuated means operate to move one or more additional blanks 111 into the channel of the guide member 210 from a hopper 211 which is mounted in an inclined position above the upper end of the guide member 210 and which has a top opening 211ᵃ through which the blanks are inserted. This hopper is in the form of a closed vessel and has a lower wall 211ᵇ which is mounted to revolve upon a supporting plate 212 having a hub portion 212ᵃ engaged by a shaft or trunnion 213 upon which the wall 211ᵇ is fixed. The lower wall 211ᵇ of the hopper is provided with a plurality of radiating grooves 211ᶜ of such width that they are adapted to receive the blanks 111 and to align with the undercut groove 210ᶜ formed in the guide member. As the hopper rotates, the blanks 111 therein are tumbled about and eventually occupy positions in the radiating channels 211ᶜ, as shown in Fig. 31. The opposite walls of the groove 210ᶜ in the guide member are curved at opposite sides of the mouth of the channel 210ᶜ, as shown at 210ᵈ, to facilitate the movement of the blanks 111 from the channels 211ᶜ to the channels 210ᶜ. A guard plate 214 is secured around the margin of the supporting plate 212 by screws 215 for preventing the blanks 111 from moving out of the channels 211ᶜ except at the point where these channels are adapted to register with the channel 210ᶜ of the guide member.

For the purpose of effecting an intermittent rotary motion of the hopper 211, which brings the channels 211ᶜ successively into alignment with the channel 210ᶜ, the shaft 213 is provided with a ratchet wheel 217 adapted to be actuated by a pawl 218 mounted on a lever 219 which is pivoted on the hub portion 217ᵃ of the ratchet wheel. The lever 219 is adapted to be actuated by a plunger 220 which is mounted to reciprocate in a cylinder 221 secured to the under side of the supporting plate 212. Compressed air or other fluid under pressure is admitted to the cylinder 221 through a nipple 222 which is connected to the previously described flexible conduit 181. A coil spring 223 is secured at one end to the lever 219 and at the other end to a pin 224 projecting from the plate 212 so that the lever 219 is normally maintained in contact with the rounded extremity of the plunger 220. After each forward stroke of the plunger 220, the extent of which is limited by a stationary pin 225, adapted to engage the lever 219, the plunger is returned to its normal position, shown in Fig. 32, by the spring 223.

In the operation of the machine hereinabove described, the reversible driving mechanism 43 is maintained in continuous operation at the desired speed which may be regulated by shifting the belt 60 on the pulleys 61 and 62 and also by adjusting the speed of the electric motor 36 in the usual manner. A source of compressed air or other suitable fluid under pressure is connected to the inlet conduit 161, and the foot-operated valve 52 is actuated by the operator to control the movements of the work holder 45 toward and from the tap 44 which normally rotates in a tapping direction or begins to rotate in that direction as soon as one of the blanks 111, carried by the holder, engages the end of the tap. The force with which the holder 45 is moved toward the tap and during the tapping operation may be regulated by adjusting the pressure regulator 54 and the speed of both the forward and return movements of the work holder may be varied by adjusting the rate of application and exhaust of the fluid pressure.

The foot pedal 152 may be held in its depressed position, in which case the work holder will be automatically operated to perform a continuing series of forward and return strokes without further attention on the part of the operator, or the foot pedal may be intermittently operated by the operator at the times when a forward stroke of the work holder is desired. Assuming that the pedal 152 is depressed, fluid under pressure is admitted from the conduit 51 through the passage 135$^g$, groove 145$^a$ and passages 135$^i$ and 135$^h$ to the lower end of the plunger 137, the piston 46 and the valve member 145 being then in their retracted positions, under the influence of the springs 125, and the plunger 137 being then in its lower position, as shown in Fig. 19. This causes the plunger 137 to move upwardly to the position shown in Figs. 13 and 14, thereby permitting the compressed fluid to flow from the passage 135$^g$ through the passage 135$^e$, annular groove 137$^b$, and passages 135$^c$ and 135$^b$ to the cylinder 47$^b$ and effect a forward movement of the piston 46 and the work holder 45.

During this forward movement of the work holder, one of the blanks 111 is tapped by the rotating tap 44 and the valve member 145 is carried along by the valve rod 130 from the position shown in Figs. 15 and 16 to the position shown in Figs. 17 and 20 thereby shutting off the flow of compressed fluid to the lower end of the plunger 137 and establishing an exhaust connection from the lower end of the bore 135$^d$ to the atmosphere through the passage 135$^n$ and the annular groove 145$^a$ in the valve member which is then in alignment with this passage. As soon as this exhaust connection is established, the coil spring 139 returns the plunger 137 to the position shown in Fig. 20, thereby shutting off the supply of compressed fluid to the cylinder 47$^b$ in which the piston 46 is mounted. This relief of the fluid pressure on the end of the piston 46 permits the piston, piston head, and work holder to be returned to their retracted positions by the coil springs 125, shown in Fig. 8. During this return movement, the compressed air in the cylinder 47$^b$ is exhausted through the passages 135$^b$ and 135$^c$, the annular groove 137$^b$ and the passages 135$^l$ and 135$^m$ to the atmosphere, and the valve rod 130 again restores the valve member 145 to the position shown in Figs. 15 and 19, so that the cycle of operations is then immediately repeated, the plunger 137 moving upwardly and establishing a connection which causes another forward stroke of the piston 46.

The speed with which the plunger 137 moves upwardly may be varied by adjusting the pin valve 144, shown in Figs. 19 and 22, and the speed of the forward movement of the piston 46 may be regulated by adjusting the pin valve 141, shown particularly in Fig. 18. By suitably adjusting the pin valve 144, motion of the plunger 137 may be regulated so that the piston 46 will be at rest for an interval at the end of its return stroke and the adjustment of the pin valve 141 may be utilized to regulate the forward motion of the piston 46 to correspond with the size and pitch of the threads being tapped in the event that the machine is being used in a tapping operation, for example. The rate of the return movement of the piston 46 and the work holder 45 may be regulated by adjusting the pin valve 146 which is mounted in the passage through which compressed fluid is exhausted from the cylinder 47$^b$ during the return stroke of the piston. By opening this valve relatively wide, for example, the work holder may be caused to have a relatively rapid return stroke which may be desirable in many operations.

These repeated operations of the work-feeding mechanism will continue as long as the operator holds the foot pedal 152 in its depressed position and the hands of the operator are then free for feeding blanks 111 to the guide channel of the work channel 45. Of course, the form of work holder shown in Figs. 1, 5, 6, 7, and 8, may be replaced by the form of work holder shown in Figs. 27, 28, and 29, or by the form of work holder shown in Figs. 30, 31, and 32. In case the last mentioned form is used, the blanks are fed automatically from the hopper to the channel of the work holder so that no attention on the part of the operator is required except to refill the hopper of the device at infrequent intervals. These automatic work-feeding operations are effected, of course, through the connections which are made by the flexible conduit 181 with the auxiliary fluid supply and exhaust passages in the valve block 135, the conduit being connected at the place where the plug 180 is shown in Fig. 16. With this arrangement, the mechanism is operated to feed a blank each time that the valve member 145 reaches the rearward position in Fig. 16, at which time fluid pressure is also admitted to the lower end of the plunger 137, and the compressed fluid from the feeding mechanism is exhausted each time that the valve member 145 reaches its forward position wherein the annular groove 145$^b$ aligns with the passage 135$^q$.

During the operation of the machine, the pressure regulator 54 may be adjusted to vary the pressure with which the work engages the tool. This pressure regulator is conveniently located with respect to the position of the valve mechanism 50 so that all of the adjustable parts may be readily manipulated by the operator while the machine is in operation. By means of this invention, all danger of injury to the operator or to the tap 44, or to other parts of the machine, is eliminated by reason of the fact that when any appreciable resistance is encountered, the forward motion of the work holder is arrested. It has been discovered that the pressure required to move the work holder during its forward stroke in a tapping operation is not great and that by employing fluid pressure, the pressure may be adjusted to the minimum so that if one of the blanks is defective or is not properly aligned with the tap, the work holder will come to rest before any injury is done.

Although one form of the invention with two modifications of the work-feeding mechanism have been shown and described by way of illustration, it will be understood that the invention may be constructed in various other embodiments without departing from the scope of the appended claims.

I claim:

1. The combination in a machine of the class described, of means for rotating a tool, a cylinder, a work holder, a piston carrying said work holder and mounted in said cylinder for movement toward and from said tool, a valve block having passages for supplying compressed fluid to said cylinder for effecting a forward movement of said piston, means for supplying compressed fluid to said valve block, and a plunger mounted in said block for controlling the flow of fluid through said passages.

2. The combination in a machine of the class described, of means for rotating a tool, a cylinder, a work holder, a piston carrying said work holder and mounted in said cylinder for movement toward and from said tool, a valve block having passages for supplying compressed fluid to said cylinder for effecting a forward movement of said piston, means for supplying compressed fluid to said valve block, a plunger mounted in said block for controlling the flow of fluid through said passages, and a valve member movable with said work holder for controlling the actuation of said plunger.

3. The combination in a machine of the class described, of means for rotating a tool, a cylinder, a work holder, a piston carrying said work holder and mounted in said cylinder for movement toward and from said tool, a valve block having passages for supplying compressed fluid to said cylinder for effecting a forward movement of said piston, means for supplying compressed fluid to said valve block, a plunger mounted in said block for controlling the flow of fluid through said passages, said valve block having passages for permitting the actuation of said plunger by fluid pressure, and a valve member movable with said work holder for controlling the admission of compressed fluid to said plunger.

4. The combination in a machine of the class described, of means for rotating a tool, a cylinder, a work holder, a piston carrying said work holder and mounted in said cylinder for movement toward and from said tool, a valve block having passages for supplying compressed fluid to said cylinder and exhausting it therefrom, a plunger mounted in said block for controlling the supply of compressed fluid to said cylinder to effect a forward stroke of said piston, and means for effecting a return stroke of said piston, said plunger being adapted to control said exhaust from said cylinder during said return stroke.

5. The combination in a machine of the class described, of means for rotating a tool, a cylinder, a work holder, a piston carrying said work holder and mounted in said cylinder for movement toward and from said tool, a valve block having passages for supplying compressed fluid to said cylinder and exhausting it therefrom, a plunger mounted in said block for controlling the supply of compressed fluid to said cylinder to effect a forward stroke of said piston, means for effecting a return stroke of said piston, said plunger being adapted to control said exhaust from said cylinder during said return stroke, and a valve member mounted in said block and actuated by the movement of said piston for controlling the operation of said plunger.

6. The combination in a machine of the class described, of means for rotating a tool, a cylinder, a work holder, a piston carrying said work holder and mounted in said cylinder for movement toward and from said tool, a valve block having passages for supplying compressed fluid to said cylinder and exhausting it therefrom, a plunger mounted in said block for controlling the supply of compressed fluid to said cylinder to effect a forward stroke of said piston, and means for effecting a return stroke of said piston, said block having a bore in which said plunger is mounted and having passages for admitting compressed fluid to said bore to cause said plunger by its movement to admit compressed fluid to said cylinder.

7. The combination in a machine of the class described, of means for rotating a tool, a cylinder, a work holder, a piston carrying said work holder and mounted in said cylinder for movement toward and from said tool, a valve block having passages for supplying compressed fluid to said cylinder and exhausting it therefrom, a plunger mounted in said block for controlling the supply of compressed fluid to said cylinder to effect a forward stroke of said piston, and means for effecting a return stroke of said piston, said block having a bore in which said plunger is mounted and having passages for admitting compressed fluid to said bore to cause said plunger by its movement to admit compressed fluid to said cylinder, and means for effecting a reverse stroke of said plunger, said block having passages for permitting the exhaust of compressed fluid from said bore during said return stroke of said plunger.

8. The combination in a machine of the class described, of means for rotating a tool, a cylinder, a work holder, a piston carrying said work holder and mounted in said cylinder for movement toward and from said tool, a valve block having passages for supplying compressed fluid to said cylinder and exhausting it therefrom, a plunger mounted in said block for controlling the supply of compressed fluid to said cylinder to effect a forward stroke of said piston, and means for effecting a return stroke of said piston, said block having a bore in which said plunger is mounted and having passages for admitting compressed fluid to said bore to cause said plunger by its movement to admit compressed fluid to said cylinder, means for effecting a reverse stroke of said plunger, said block having passages for permitting the exhaust of compressed fluid from said bore during said return stroke of said plunger, and a valve member for controlling the admission of compressed fluid to said bore and the exhaust of said fluid therefrom.

9. The combination in a machine of the class described, of means for rotating a tool, a cylinder, a work holder, a piston carrying said work holder and mounted in said cylinder for movement toward and from said tool, a valve block having passages for supplying compressed fluid to said cylinder and exhausting it therefrom, a plunger mounted in said block for controlling the supply of compressed fluid to said cylinder to effect a forward stroke of said piston, and means for effecting a return stroke of said piston, said block having a bore in which said plunger is mounted and having passages for admitting compressed fluid to said bore to cause said plunger by its movement to admit compressed fluid to said cylinder, means for effecting a reverse stroke of said plunger, said block having passages for permitting the exhaust of compressed fluid from said bore during said return stroke of said plunger, a valve member for controlling the admission of compressed fluid to said bore and the exhaust of said fluid therefrom, and means for causing said valve member to be actuated by the movements of said piston.

10. The combination in a machine of the class described, of means for rotating a tool, a cylinder, a work holder, a piston carrying said work holder and mounted in said cylinder for movement toward and from said tool, means for admitting compressed fluid to said cylinder to effect a forward movement of said piston, resilient means for effecting a reverse movement of said piston, means for permitting the exhaust of said fluid from said cylinder, and means for adjusting the rate of said exhaust.

11. The combination in a machine of the class described, of means for rotating a tool, a cylinder, a work holder, a piston carrying said work holder and mounted in said cylinder for movement toward and from said tool, means for admitting compressed fluid to said cylinder to effect a forward movement of said piston, resilient means for effecting a reverse movement of said piston, means for regulating the rate of application of said fluid to said piston, means for permitting the exhaust of said fluid from said cylinder, and means for adjusting the rate of said exhaust.

12. The combination in a machine of the class described, of means for rotating a tool, a cylinder, a work holder, a piston carrying said work holder and mounted in said cylinder for movement toward and from said tool, a valve block having passages for supplying compressed fluid to said cylinder and exhausting it therefrom, a plunger mounted in said block for controlling the supply of compressed fluid to said cylinder to effect a forward stroke of said piston, means for effecting a return stroke of said piston, and means for adjusting the rate of flow of said fluid to said cylinder when it is admitted thereto by said plunger.

13. The combination in a machine of the class described, of means for rotating a tool, a cylinder, a work holder, a piston carrying said work holder and mounted in said cylinder for movement toward and from said tool, a valve block having passages for supplying compressed fluid to said cylinder and exhausting it therefrom, a plunger mounted in said block for controlling the supply of compressed fluid to said cylinder to effect a forward stroke of said piston, means for effecting a return stroke of said piston, said plunger being adapted to control said exhaust from said cylinder during said return stroke, and means for adjusting the rate of said exhaust.

14. The combination in a machine of the class described, of means for rotating a tool, a cylinder, a work holder, a piston carrying said work holder and mounted in said cylinder for movement toward and from said tool, a valve block having passages for supplying compressed fluid to said cylinder and exhausting it therefrom, a plunger mounted in said block for controlling the supply of compressed fluid to said cylinder to effect a forward stroke of said piston, means for effecting a return stroke of said piston, said block having a bore in which said plunger is mounted and having passages for admitting compressed fluid to said bore to cause said plunger by its movement to admit compressed fluid to said cylinder, and means for adjusting the rate of admission of compressed fluid to said bore.

15. The combination in a machine of the class described, of means for rotating a tool, a cylinder, a work holder, a piston carrying said work holder and mounted in said cylinder for movement toward and from said tool, a valve block having passages for supplying compressed fluid to said cylinder and exhausting it therefrom, a plunger mounted in said block for controlling the supply of compressed fluid to said cylinder to effect a forward stroke of said piston, means for effecting a return stroke of said piston, said block having a bore in which said plunger is mounted and having passages for admitting compressed fluid to said bore to cause said plunger by its movement to admit compressed fluid to said cylinder, means for adjusting the rate of flow of said fluid to said cylinder when it is admitted thereto by said plunger, and means for adjusting the rate of admission of compressed fluid to said bore.

16. The combination in a machine of the class described, of means for rotating a tool, a cylinder, a work holder, a piston carrying said work holder and mounted in said cylinder for movement toward and from said tool, a valve block having passages for supplying compressed fluid to said cylinder and exhausting it therefrom, a plunger mounted in said block for controlling the supply of compressed fluid to said cylinder to effect a forward stroke of said piston, means for effecting a return stroke of said piston, said block having a bore in which said plunger is mounted and having passages for admitting compressed fluid to said bore to cause said plunger by its movement to admit compressed fluid to said cylinder, means for adjusting the rate of flow of said fluid to said cylinder when it is admitted thereto by said plunger, means for adjusting the rate of said exhaust, and means for adjusting the rate of admission of compressed fluid to said bore.

17. The combination in a machine of the class described, of means for rotating a tool, a work holder, means operated by fluid pressure for moving said work holder toward said tool, means for producing a return movement of said work holder, and fluid pressure-operated means actuated upon said return movement for moving a blank in said holder to a position opposite said tool.

18. The combination in a machine of the class described, of means for rotating a tool, a work holder, resilient means for holding a blank in said work holder in a position opposite said tool, means producing a return movement of said work holder after said blank has been operated on by said tool, and fluid pressure-operated means actuated upon said return movement for releasing said blank from said resilient means and moving another blank into said position.

19. The combination in a machine of the class described, of means for rotating a tool, a work holder having a guide channel adapted to hold a blank opposite said tool, a hopper having a rotatable wall provided with rotating grooves in which said blanks are adapted to align during the rotation of said wall, said grooves being adapted to align successively with said channel, and fluid pressure-operated means for imparting an intermittent rotary movement to said wall.

20. The combination in a machine of the class described, of means for rotating a tool, a cylinder, a work holder, a piston carrying said work holder and mounted in said cylinder for movement toward and from said tool, a valve block having passages for supplying compressed fluid to said cylinder and exhausting its therefrom, a plunger mounted in said block for controlling the supply of compressed fluid to said cylinder to effect a forward stroke of said piston, means for effecting a return stroke of said piston, said block having a bore in which said plunger is mounted and having passages for admitting compressed fluid to said bore to cause said plunger by its movement to admit compressed fluid to said cylinder, and fluid pressure-operated means actuated when said plunger is actuated for feeding a blank in said work holder.

21. The combination in a machine of the class described, of means for rotating a tool, a cylinder, a work holder, a piston carrying said work holder and mounted in said cylinder for movement toward and from said tool, a valve block having passages for supplying compressed fluid to said cylinder and exhausting it therefrom, a plunger mounted in said block for controlling the supply of compressed fluid to said cylinder to effect a forward stroke of said piston, means for effecting a return stroke of said piston, said block having a bore in which said plunger is mounted and having passages for admitting compressed fluid to said bore to cause said plunger by its movement to admit compressed fluid to said cylinder, means for effecting a reverse stroke of said plunger, said block having passages for permitting the exhaust of compressed fluid from said bore during said return stroke of said plunger, feeding means adapted to be operated by compressed fluid for feeding blanks in said work holder between successive forward movements of said piston, and a fluid connection from said block to said feeding means, said block having auxiliary passages for supplying fluid under pressure to said connection when compressed fluid is admitted to said bore and for exhausting fluid from said connection after said feeding means has been operated.

22. The combination in a machine of the class described, of means for rotating a tool, a cylinder, a work holder, a piston carrying said work holder and mounted in said cylinder for movement toward and from said tool, a valve block having passages for supplying compressed fluid to said cylinder and exhausting it therefrom, a plunger mounted in said block for controlling the supply of compressed fluid to said cylinder to effect a forward stroke of said piston, means for effecting a return stroke of said piston, said block having a bore in which said plunger is mounted and having passages for admitting compressed fluid to said bore to cause said plunger by its movement to admit compressed fluid to said cylinder, means for effecting a reverse stroke of said plunger, said block having passages for permitting the exhaust of compressed fluid from said bore during said return stroke of said plunger, feeding means adapted to be operated by compressed fluid for feeding blanks in said work holder between successive forward movements of said piston, a fluid connection from said block to said feeding means, said block having auxiliary passages for supplying fluid under pressure to said connection when compressed fluid is admitted to said bore and for exhausting fluid from said connection after said feeding means has been operated, and a valve member actuated by the movement of said piston for controlling the admission of compressed fluid to and the exhaust of fluid from said connection leading to said feeding means.

23. The combination in a machine of the class described, of means for rotating a tool, a cylinder, a work holder, a piston carrying said work holder and mounted in said cylinder for movement toward and from said tool, a valve block carried by said cylinder and having passages for supplying compressed fluid to said cylinder for effecting a forward movement of said piston, means for supplying compressed fluid to said valve block, and valve means carried by said block for controlling the flow of fluid through said passages.

24. The combination in a machine of the class described, of means for rotating a tool, a cylinder, a work holder, a piston carrying said work holder and mounted in said cylinder for movement toward and from said tool, a valve block carried by said cylinder and having passages for supplying compressed fluid to said cylinder for effecting a forward movement of said piston, means for supplying compressed fluid to said valve block, and valve means carried by said block for controlling the flow of fluid through said passages, said valve block having passages for permitting the actuation of said valve means by said fluid pressure.

25. The combination in a machine of the class described, of means for rotating a tool, a cylinder, a work holder, a piston carrying said work holder and mounted in said cylinder for movement toward and from said tool, a valve block having passages for supplying compressed fluid to said cylinder for effecting a forward movement of said piston, means for supplying compressed fluid to said valve block, means mounted in said valve block for controlling the flow of fluid through said passages, said valve block having passages for permitting actuation of said last named means by fluid pressure, and means movable with said work holder for controlling the admission of compressed fluid to said first named means.

HERMAN GOLDBERG.